US011604325B2

(12) United States Patent
Wu et al.

(10) Patent No.: US 11,604,325 B2
(45) Date of Patent: Mar. 14, 2023

(54) IMAGING LENS MODULE WITH PLASTIC BARREL AND ELECTRONIC DEVICE INCLUDING SAME MODULE

(71) Applicant: LARGAN PRECISION CO., LTD., Taichung (TW)

(72) Inventors: Chien-Hsun Wu, Taichung (TW); Lin-An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 62 days.

(21) Appl. No.: 16/812,507

(22) Filed: Mar. 9, 2020

(65) Prior Publication Data

US 2020/0341228 A1    Oct. 29, 2020

(30) Foreign Application Priority Data

Apr. 29, 2019 (TW) .................................. 108114950

(51) Int. Cl.
*G02B 7/02* (2021.01)
*H04N 5/225* (2006.01)

(52) U.S. Cl.
CPC .............. *G02B 7/025* (2013.01); *G02B 7/021* (2013.01); *H04N 5/2254* (2013.01)

(58) Field of Classification Search
CPC .......... G02B 7/025; G02B 7/021; G02B 7/09; G02B 27/0018; H04N 5/2254
USPC .................................................. 359/819–830
See application file for complete search history.

(56) References Cited

U.S. PATENT DOCUMENTS

| 7,729,606 | B2 | 6/2010 | Webster et al. |
| 8,786,041 | B2 | 7/2014 | Iwafuchi et al. |
| 9,069,119 | B2 | 6/2015 | Takase et al. |
| 9,210,309 | B2 | 12/2015 | Park et al. |
| 9,513,454 | B2 | 12/2016 | Lin et al. |
| 9,904,050 | B2 | 2/2018 | Lin et al. |
| 10,082,649 | B2 | 9/2018 | Park et al. |
| 10,101,557 | B2 | 10/2018 | Tsai et al. |
| 10,128,290 | B2 | 11/2018 | Iwafuchi et al. |
| 10,222,516 | B2 | 3/2019 | Chou et al. |

(Continued)

FOREIGN PATENT DOCUMENTS

TW    202011068 A  *  9/2018

*Primary Examiner* — Mahidere S Sahle
(74) *Attorney, Agent, or Firm* — McClure, Qualey & Rodack, LLP

(57) ABSTRACT

An imaging lens module has an optical axis, an object side and an image side. The imaging lens module includes a plastic barrel, an optical lens assembly, an image-side assembled element and a light blocking element assembly. The plastic barrel includes a first contacting surface, which is close to an image-side end of the plastic barrel. The image-side assembled element is disposed close to the image-side end of the plastic barrel. The image-side assembled element is in a tube shape and extends from the object side to the image side. The image-side assembled element includes a second contacting surface and an inner protruding portion, and the second contacting surface is disposed close to an object-side end of the image-side assembled element and correspondingly to the first contacting surface. The plastic barrel and the image-side assembled element contact each other via the first contacting surface and the second contacting surface.

21 Claims, 28 Drawing Sheets

(56) References Cited

U.S. PATENT DOCUMENTS

| | | |
|---|---|---|
| 10,228,497 B2 | 3/2019 | Chou et al. |
| 2016/0231526 A1* | 8/2016 | Lin .................. G02B 1/041 |
| 2016/0370579 A1* | 12/2016 | Cho .................. G02B 27/0018 |
| 2017/0108627 A1* | 4/2017 | Chou ................ G02B 13/0045 |
| 2017/0227687 A1* | 8/2017 | Chou ................ G02B 27/0018 |
| 2018/0129011 A1* | 5/2018 | Tsai ................. H04N 5/2254 |
| 2018/0246260 A1* | 8/2018 | Chou ................ G02B 27/0988 |
| 2018/0246290 A1* | 8/2018 | Wang ................ G02B 13/0045 |
| 2020/0081321 A1* | 3/2020 | Tseng ................ G03B 13/36 |

* cited by examiner

IMAGING LENS MODULE WITH PLASTIC BARREL AND ELECTRONIC DEVICE INCLUDING SAME MODULE

RELATED APPLICATIONS

This application claims priority to Taiwan Application Serial Number 108114950, filed Apr. 29, 2019, which is herein incorporated by reference.

BACKGROUND

Technical Field

The present disclosure relates to an imaging lens module and an electronic device. More particularly, the present disclosure relates to a compact imaging lens module which includes a plastic barrel and is applicable to electronic devices.

Description of Related Art

With the advanced semiconductor manufacturing technologies, the performances of image sensors are enhanced, and the pixel size is minified. Therefore, imaging lens modules with high image quality become indispensable.

Moreover, with the rapid scientific and technological progress, the application scope of electronic devices equipped with imaging lens modules becomes wider, and the requirements for imaging lens modules are more diverse. However, it is hard for balancing the requirements, such as image quality, sensitivity, aperture size, volume and field of view, in conventional imaging lens modules. Therefore, an imaging lens module is provided by the present disclosure to satisfy the desired requirement.

SUMMARY

According to one aspect of the present disclosure, an imaging lens module has an optical axis, an object side and an image side. The imaging lens module includes a plastic barrel, an optical lens assembly, an image-side assembled element and a light blocking element assembly. The plastic barrel surrounds the optical axis to form an accommodating space and includes a first contacting surface, which is close to an image-side end of the plastic barrel. The optical lens assembly is disposed in the accommodating space of the plastic barrel and includes a plurality of optical lens elements. The image-side assembled element is disposed close to the image-side end of the plastic barrel. The image-side assembled element is in a tube shape and extends from the object side to the image side, and the image-side assembled element surrounds the optical axis and is disposed coaxially with the plastic barrel. The image-side assembled element includes a second contacting surface and an inner protruding portion, the second contacting surface is disposed close to an object-side end of the image-side assembled element and correspondingly to the first contacting surface, the inner protruding portion extends toward the optical axis, and a minimum opening of the image-side assembled element is located at the inner protruding portion. The light blocking element assembly is disposed in the image-side assembled element and includes a plurality of light blocking elements. One of the light blocking elements is abutted with an annular wall of the inner protruding portion. The plastic barrel and the image-side assembled element contact each other via the first contacting surface and the second contacting surface.

When a length along an optical axis direction of the plastic barrel is L1, and a length along the optical axis direction of the image-side assembled element is L2, the following condition is satisfied: $1.5 < L1/L2 < 5.0$.

According to another aspect of the present disclosure, an electronic device includes the imaging lens module according to the foregoing aspect and an image sensor, which is disposed on an image surface of the imaging lens module.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1A:
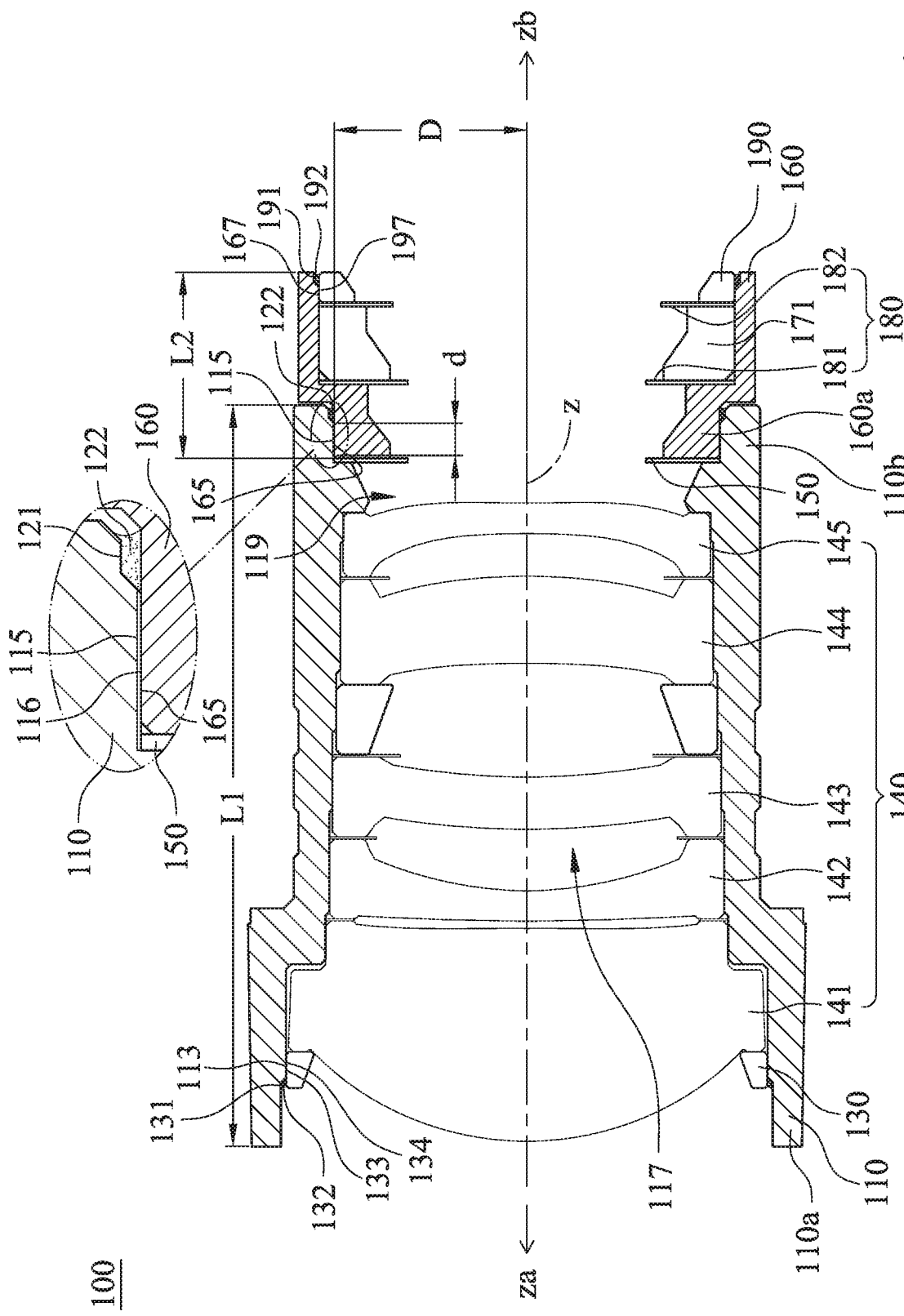
FIG. 1A is a schematic view of an imaging lens module according to the 1st embodiment of the present disclosure.
Figure 1B:
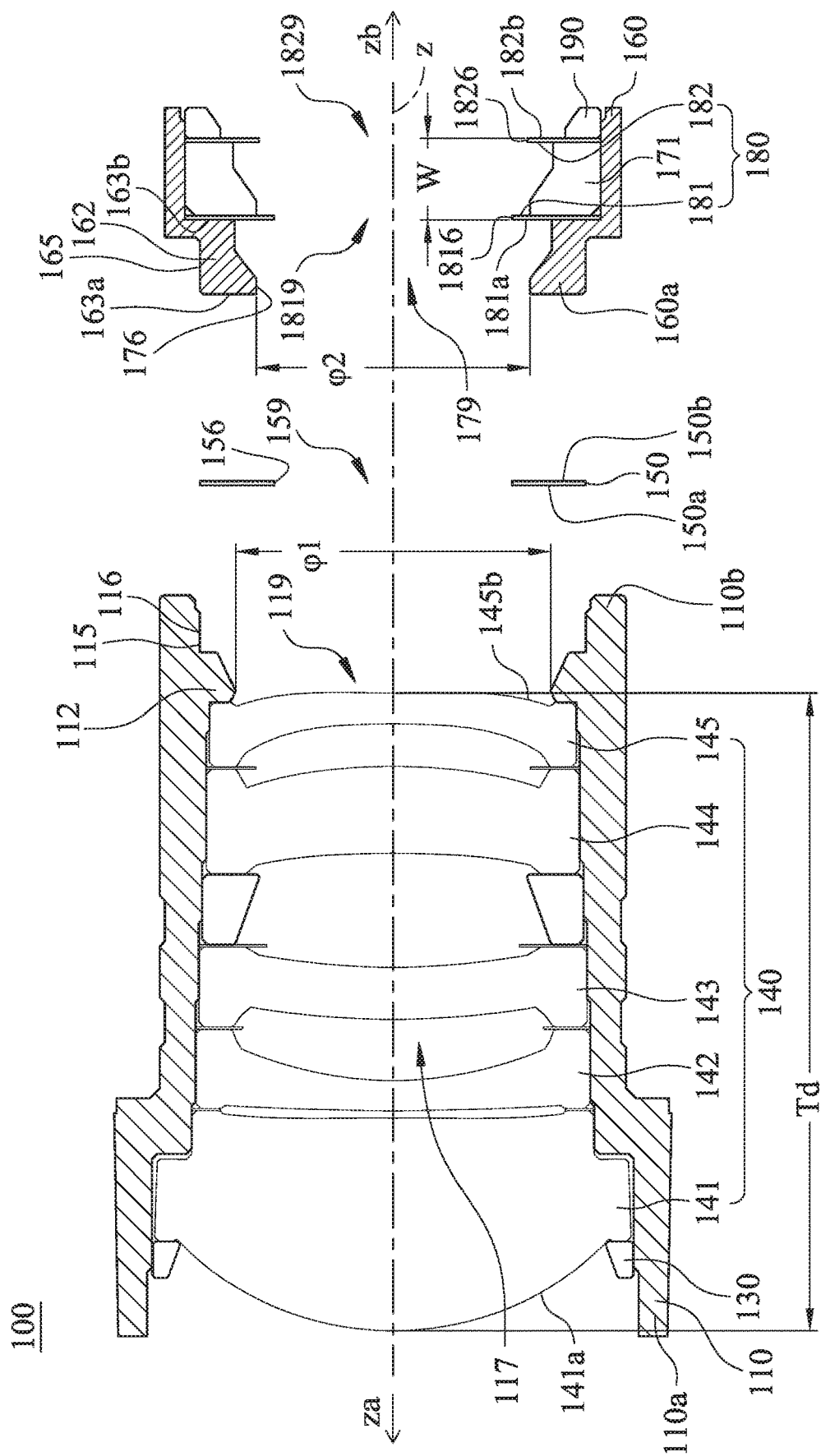
FIG. 1B is an exploded view of the imaging lens module according to FIG. 1A.
Figure 1C:
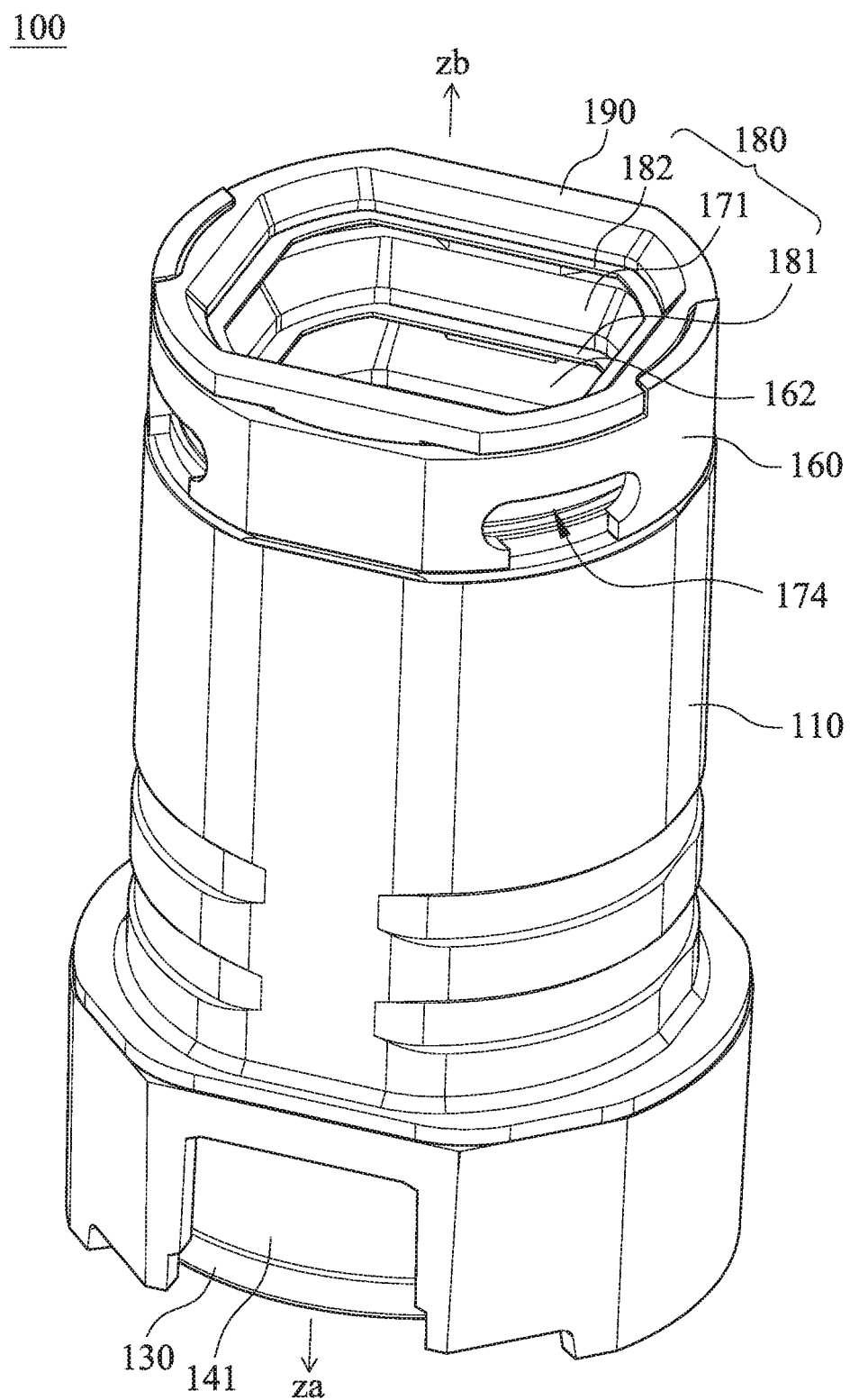
FIG. 1C is a three-dimensional view of the imaging lens module according to the 1st embodiment.
Figure 1D:
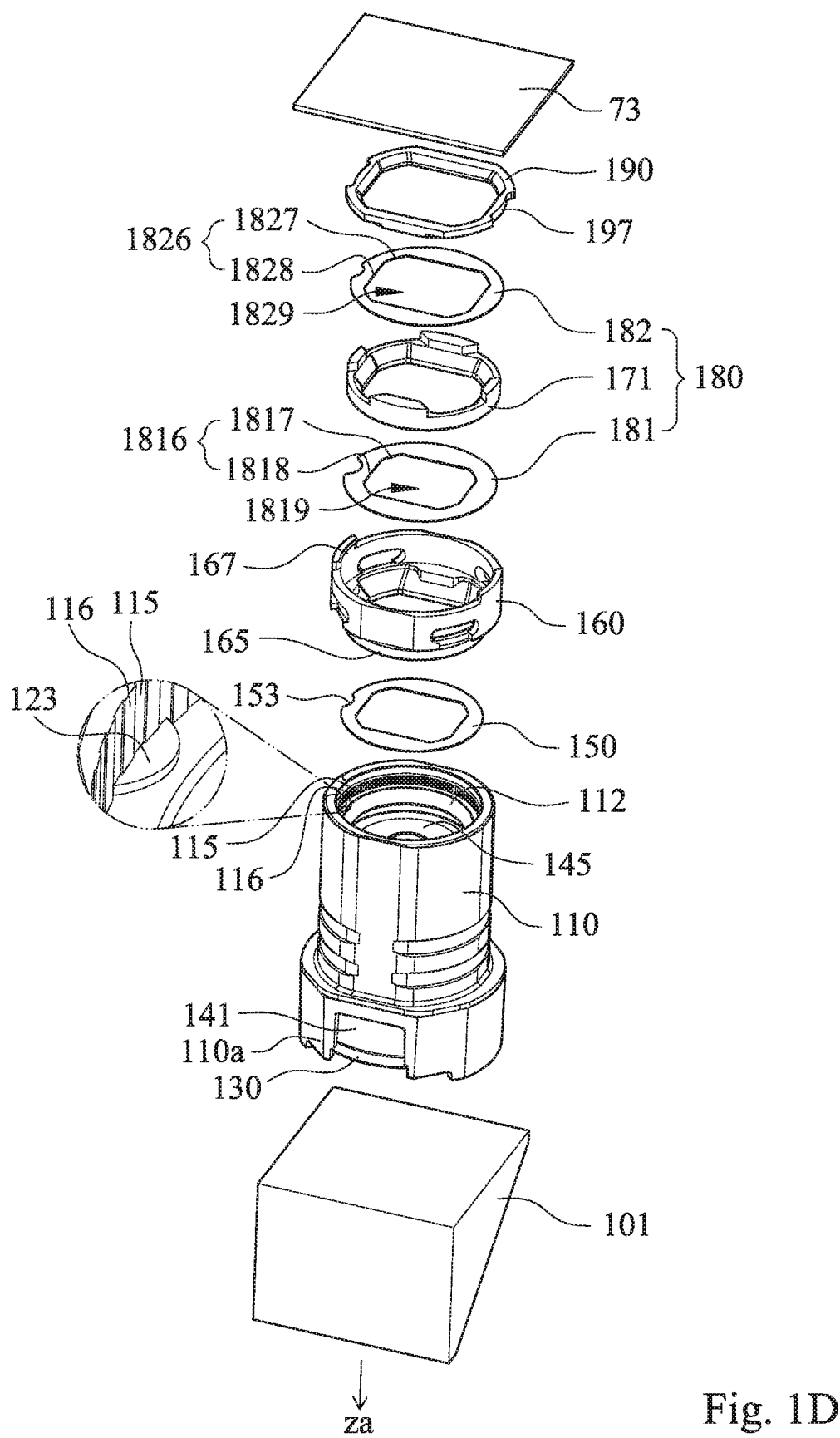
FIG. 1D is an exploded view of the imaging lens module according to FIG. 1C and an image sensor.

FIG. 1A is a schematic view of an imaging lens module 100 according to the 1st embodiment of the present disclosure. FIG. 1B is an exploded view of the imaging lens module 100 according to FIG. 1A. FIG. 1C is a three-dimensional view of the imaging lens module 100 according to the 1st embodiment. FIG. 1D is an exploded view of the imaging lens module 100 according to FIG. 1C and an image sensor 73. In FIG. 1A to FIG. 1D, an imaging lens module 100 has an optical axis z, an object side za and an image side zb. The object side za is a side toward an imaged-object (not shown in drawings) of the imaging lens module 100, and the image side zb is a side toward an image surface (not shown in drawings) of the imaging lens module 100. The imaging lens module 100 includes a plastic barrel 110, an optical lens assembly 140, an image-side assembled element 160 and a light blocking element assembly 180. In addition, when the imaging lens module 100 is assembled in an electronic device, the image sensor 73 of the electronic device is disposed on the image surface of the imaging lens module 100.

Figure 1E:
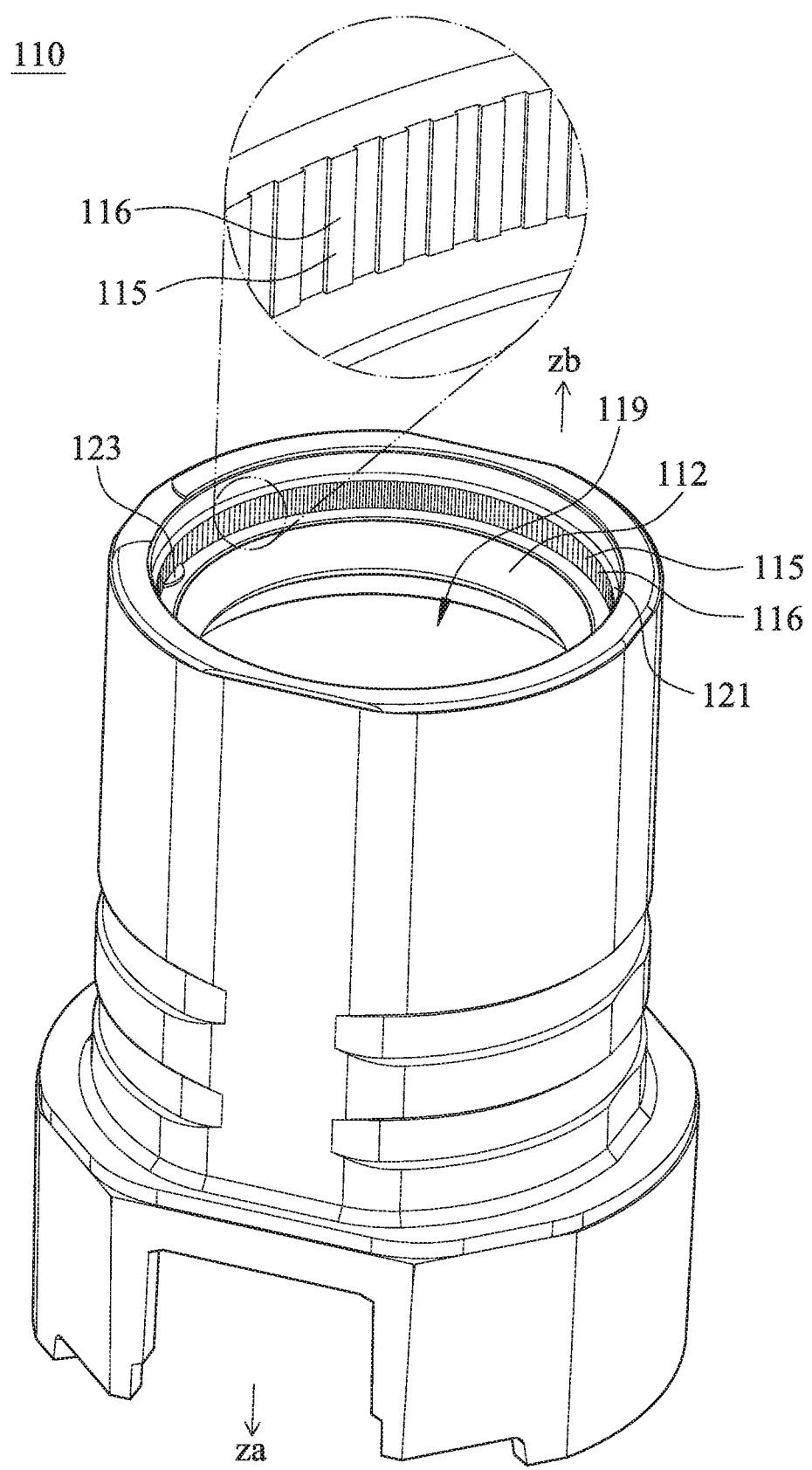
FIG. 1E is a three-dimensional view of a plastic barrel of the 1st embodiment.
Figure 1F:
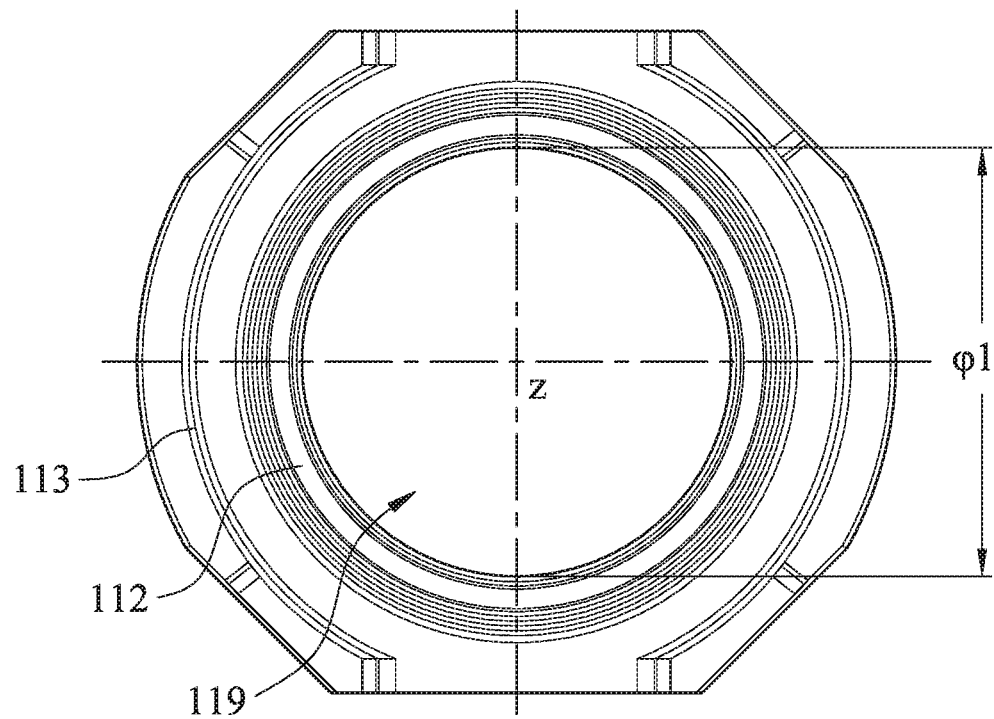
FIG. 1F is a side view from an object side of the plastic barrel of the 1st embodiment.
Figure 1G:
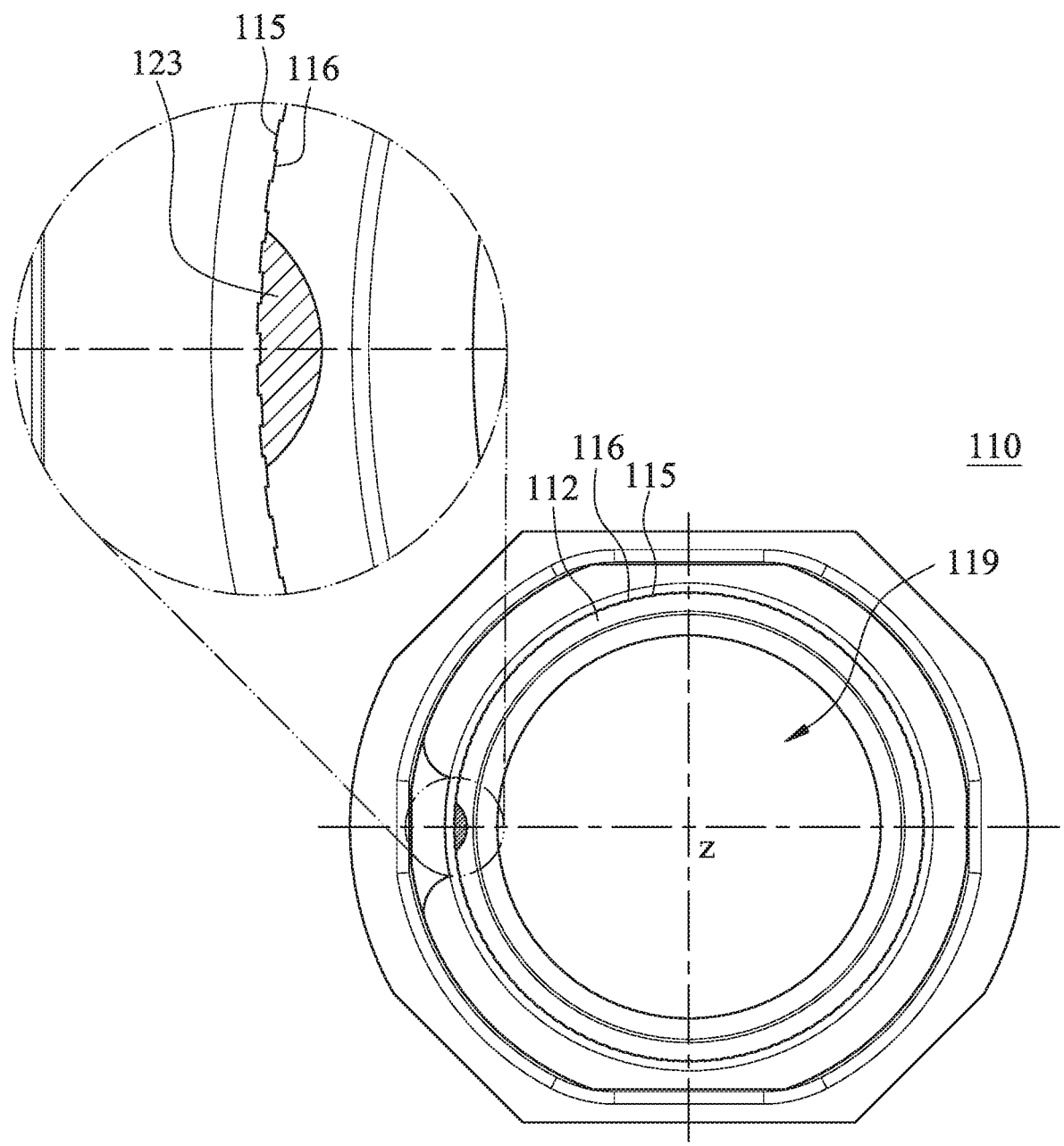
FIG. 1G is a side view from an image side of the plastic barrel of the 1st embodiment.

FIG. 1E is a three-dimensional view of the plastic barrel 110 of the 1st embodiment. FIG. 1F is a side view from the object side za of the plastic barrel 110 of the 1st embodiment. FIG. 1G is a side view from the image side zb of the plastic barrel 110 of the 1st embodiment. In FIG. 1A, FIG. 1E to FIG. 1G, the plastic barrel 110 surrounds the optical axis z to form an accommodating space 117 and includes a first contacting surface 115, which is close to an image-side end 110b of the plastic barrel 110. The image-side end 110b is an end, which is toward the image side zb, of the plastic barrel 110. Specifically, the plastic barrel 110 is in a tube shape and extends from the object side za to the image side zb (i.e., extends from the image side zb to the object side za). The plastic barrel 110 further includes an inner protruding portion 112, which extends toward the optical axis z, and a minimum opening 119 of the plastic barrel 110 is located at the inner protruding portion 112.

The optical lens assembly 140 is disposed in the accommodating space 117 of the plastic barrel 110 and includes a plurality of (i.e., at least two) optical lens elements. Specifically, the optical lens assembly 140 includes optical lens elements 141, 142, 143, 144 and 145, in order from the object side za to the image side zb.

Figure 1H:
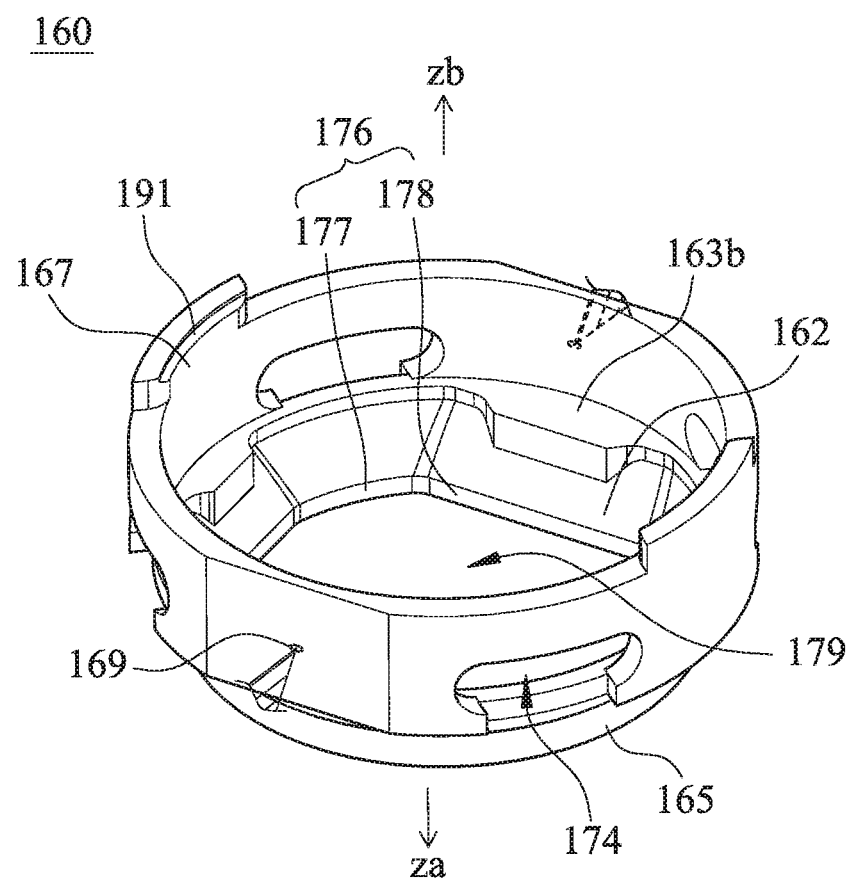
FIG. 1H is a three-dimensional view of an image-side assembled element of the 1st embodiment.
Figure 1I:
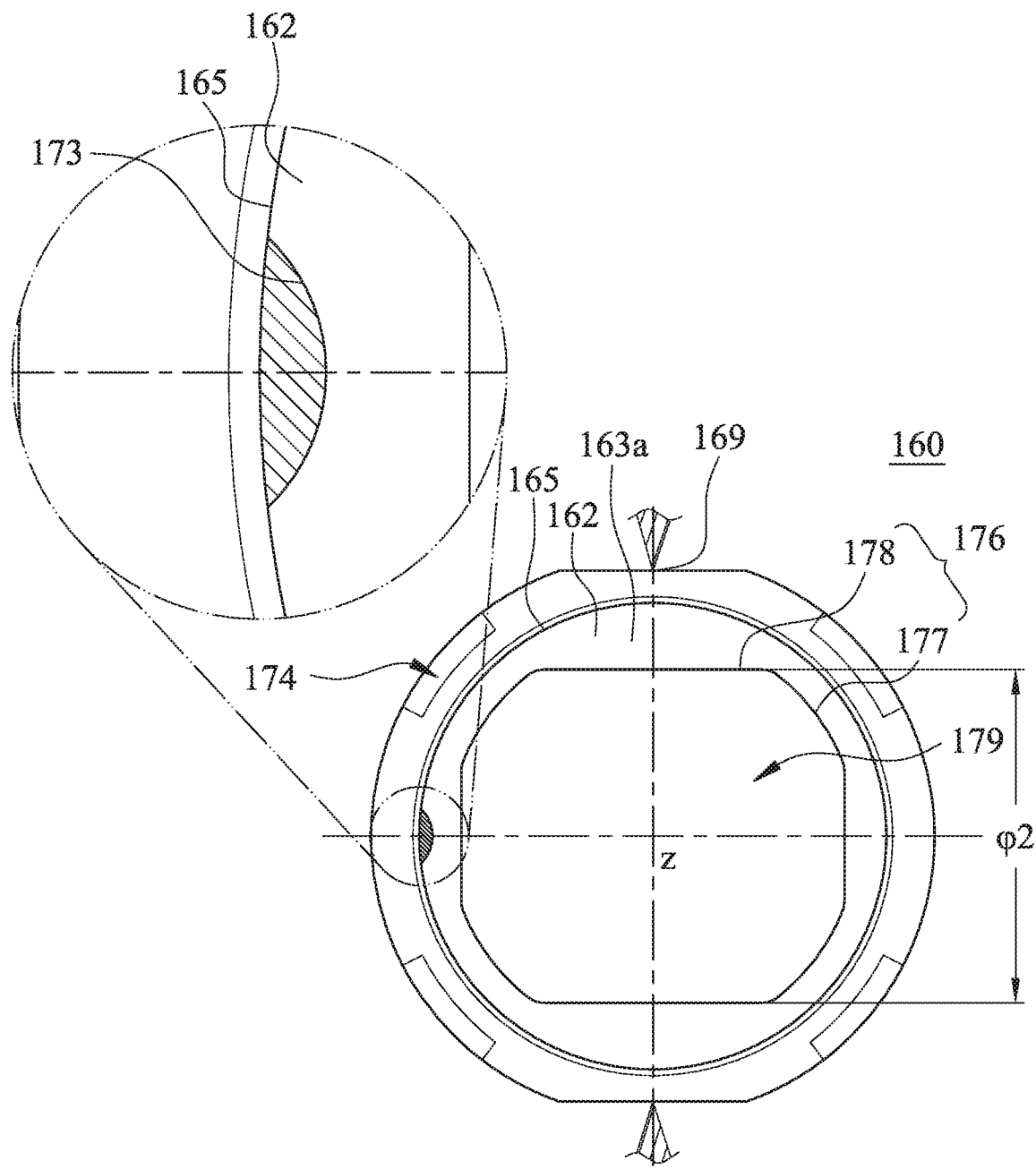
FIG. 1I is a side view from the object side of the image-side assembled element of the 1st embodiment.
Figure 1J:
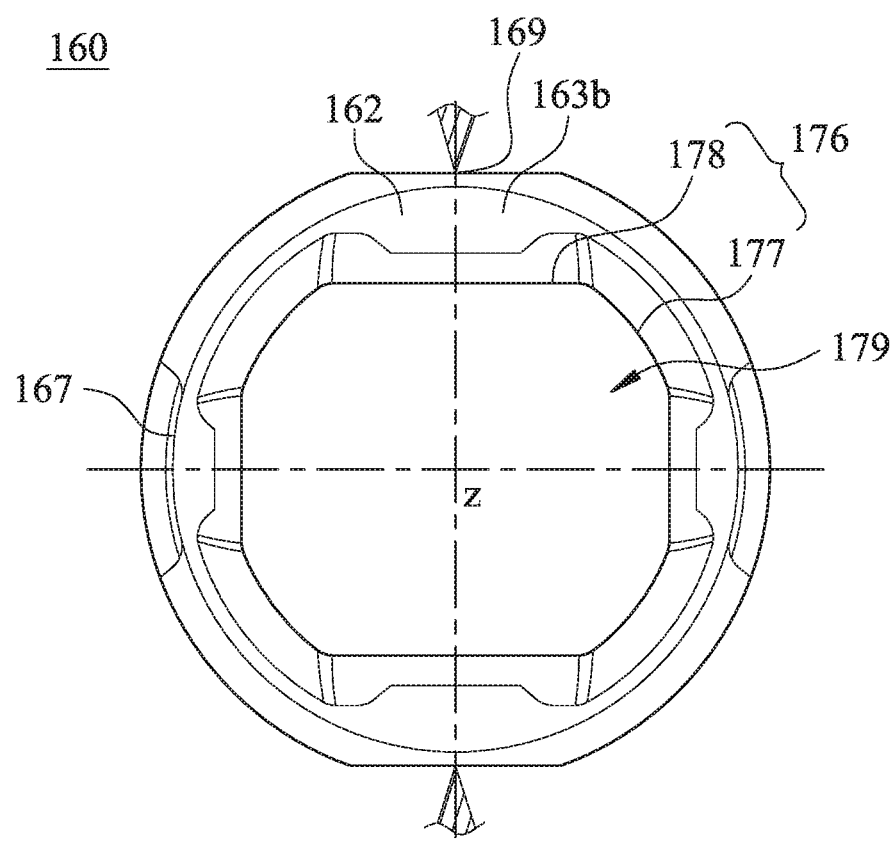
FIG. 1J is a side view from the image side of the image-side assembled element of the 1st embodiment.

FIG. 1H is a three-dimensional view of the image-side assembled element 160 of the 1st embodiment. FIG. 1I is a side view from the object side za of the image-side assembled element 160 of the 1st embodiment. FIG. 1J is a side view from the image side zb of the image-side assembled element 160 of the 1st embodiment. In FIG. 1A, FIG. 1B and FIG. 1H to FIG. 1J, the image-side assembled element 160 is disposed close and connected to the image-side end 110b of the plastic barrel 110. The image-side assembled element 160 is in a tube shape and extends from the object side za to the image side zb (i.e., extends from the image side zb to the object side za), and the image-side assembled element 160 surrounds the optical axis z and is disposed coaxially with the plastic barrel 110. The image-side assembled element 160 includes a second contacting surface 165 and an inner protruding portion 162. The second contacting surface 165 is disposed close to an object-side end 160a of the image-side assembled element 160 and correspondingly to the first contacting surface 115. The object-side end 160a is an end, which is toward the object side za, of the image-side assembled element 160. The inner protruding portion 162 extends toward the optical axis z, and a minimum opening 179 of the image-side assembled element 160 is located at the inner protruding portion 162.

In FIG. 1A to FIG. 1D, the light blocking element assembly 180 is disposed in the image-side assembled element 160 and includes a plurality of (i.e., at least two) light blocking elements. Specifically, the light blocking element assembly 180 includes light blocking elements 181, 171 and 182, in order from the object side za to the image side zb. The light blocking element 181 among the light blocking elements 181, 171 and 182 is abutted with an annular wall 163b of the inner protruding portion 162. In the 1st embodiment, each of the light blocking elements 181 and 182 is a light blocking sheet, the light blocking element 171 is a spacer, and the light blocking element 171 is disposed between the light blocking elements 181 and 182. The inner protruding portion 162 of the image-side assembled element 160 includes annular walls 163a and 163b. A normal direction of the annular wall 163a and a normal direction of the annular wall 163b are both parallel to the optical axis z.

In FIG. 1A, the plastic barrel 110 and the image-side assembled element 160 both in the tube shapes contact each other via the first contacting surface 115 and the second contacting surface 165 to be disposed coaxially with respect to the optical axis z. Specifically, the first contacting surface 115 is located at an inner annular surface of the plastic barrel 110, which is closer to the optical axis z than an outer annular surface thereof. The second contacting surface 165 is located at an outer annular surface of the image-side assembled element 160, which is farther away from the optical axis z than an inner annular surface thereof.

Furthermore, the plastic barrel 110 and the optical lens assembly 140 are assembled to be an optical imaging assembly. The optical lens assembly 140 may further include light blocking elements, such as a light blocking sheet, a spacer, etc. As shown in FIG. 1A and FIG. 1B, there are a light blocking sheet and a spacer in order from the object side za to the image side zb between the optical lens elements 143 and 144. The optical imaging assembly has light refractive power for imaging and controlling the image quality. The image-side assembled element 160 and the light blocking element assembly 180 are assembled to be an image-side light blocking assembly, which does not include a lens element. The image-side light blocking assembly is configured to block light so as to block the stray light.

When a length along a direction of the optical axis z (i.e., an optical axis z direction) of the plastic barrel 110 is L1, and a length along the direction of the optical axis z of the image-side assembled element 160 is L2, the following condition is satisfied: $1.5 < L1/L2 < 5.0$. Therefore, there are two assemblies (i.e., the optical imaging assembly and the image-side light blocking assembly aforementioned in the last paragraph) configured in the imaging lens module according to the present disclosure. One assembly thereof is configured to optically image, and the other assembly thereof is configured to block the stray light. Thus, it is favorable for selecting and arranging the optical imaging assembly and the image-side light blocking assembly with the corresponding types based on various specifications and requirements, so as to raise the production efficiency and reduce the production cost of the imaging lens module. Moreover, the imaging lens module 100 assembled with two assemblies is advantageous in tolerating more concentricity tolerances, maintaining the manufacturing yield rate, and reducing the stray light in an image-side end of the imaging lens module 100 so as to enhance the image quality.

Furthermore, the image-side assembled element 160 and the light blocking element assembly 180 with the light blocking design are added to the plastic barrel 110 on the image side zb is applicable in the imaging lens module 100 being as a telephoto optical system. The image-side assembled element 160 is assembled on the plastic barrel 110 on the image side zb, and thereby the plastic barrel 110 and the image-side assembled element 160 can be assembled with the optical lens assembly 140 and the light blocking element assembly 180, respectively, to add the light blocking manners. The light blocking manners added by the image-side assembled element 160 and the light blocking element assembly 180 are favorable for suppressing the flare occurrences come out of the imaging lens module 100, in particular, suppressing the stray light defects neglected in the engineering design phase of the lens driving apparatus (e.g., autofocus assembly) itself. In addition, the design of the image-side assembled element 160 and the light blocking element assembly 180 would not negatively affect the image quality and specification of the optical lens assembly 140 after assembling with the light blocking manners.

In FIG. 1A and FIG. 1H, a glue groove 121 may be formed between the plastic barrel 110 and the image-side assembled element 160. A glue material 122 is disposed in the glue groove 121. The glue material 122 is an adhesive of unlimited materials. Therefore, the imaging lens module 100 is advantageous in being processed by a side-dispensing technique so as to increase the structural stability thereof. In the 1st embodiment, the glue groove 121 is formed between a recessed section of the inner annular surface of the plastic barrel 110 and the outer annular surface of the image-side assembled element 160. The image-side assembled element 160 includes at least two annular side openings 174, so that the glue groove 121 between the plastic barrel 110 and the image-side assembled element 160 is connected to the outside of the imaging lens module 100.

In FIG. 1A, FIG. 1D and FIG. 1E, at least one of the first contacting surface 115 and the second contacting surface 165 (specifically, the first contacting surface 115) may include a plurality of stripe structures 116. Each of the stripe structures 116 is in a stripe shape being slightly protruded or slightly recessed, and extends to the glue groove 121 between the plastic barrel 110 and the image-side assembled element 160. The stripe structures 116 are regularly arranged along a circumferential direction of the optical axis z. Therefore, it is favorable for providing more assembling and contacting force between the plastic barrel 110 and the image-side assembled element 160, and thereby achieving a more stable structure of the imaging lens module 100 while cooperating with the glue. In the 1st embodiment, each of the first contacting surface 115, the second contacting surface 165 and the glue groove 121 is in an annular shape (i.e., a ring shape) around the optical axis z. In another embodiment according to the present disclosure (not shown in drawings), each of the first contacting surface and the second contacting surface includes a plurality of stripe structures.

When a number of the stripe structures 116 of the first contacting surface 115 is N, the following condition may be satisfied: $60 \leq N \leq 360$. Therefore, the denser arrangement of the stripe structures 116 is beneficial for the glue material 122 to evenly flow.

In FIG. 1A, when a length along the direction of the optical axis z of each of the first contacting surface 115 and the second contacting surface 165 is d, and a smallest distance from the first contacting surface 115 and the second contacting surface 165 to the optical axis z is D, the following condition may be satisfied: $0.03 < d/D < 0.35$. Therefore, the plastic barrel 110 and the image-side assembled element 160 are firmly and stably assembled via the first contacting surface 115 and the second contacting surface 165.

In FIG. 1B, FIG. 1F and FIG. 1I, when a diameter of a minimum opening 119 of the plastic barrel 110 is φ1, and a diameter of the minimum opening 179 of the image-side assembled element 160 is φ2, the following condition may be satisfied: $0.7 < \varphi 2/\varphi 1 < 1.2$. Therefore, it is favorable for preventing the excess concentric tolerance between the plastic barrel 110 and the image-side assembled element 160. In addition, the minimum opening 179 of the image-side assembled element 160 is in a non-circular shape, and the parameter φ2 is a minimum diameter passing through the optical axis z of the minimum opening 179, as shown in FIG. 1I.

In FIG. 1B, FIG. 1H and FIG. 1J, the minimum opening 179 is formed by a minimum inner annular surface 176 of the image-side assembled element 160. The minimum inner annular surface 176 is a position of the inner annular surface of the image-side assembled element 160 located corresponding to the minimum opening 179. The minimum opening 179 is in a non-circular shape. The minimum inner annular surface 176 includes a plurality of arc sections 177 and a plurality of line sections 178. The arc sections 177 have the same radius value (i.e., the same curvature radius value) and the same circle center being the optical axis z. The arc sections 177 and the line sections 178 are alternatively arranged along the circumferential direction of the optical axis z. Two ends of each of the line sections 178 are respectively connected to two of the arc sections 177, i.e., two ends of each of the arc sections 177 are respectively connected to two of the line sections 178. Therefore, it is favorable for alignment identifying during assembling the imaging lens module 100. In the 1st embodiment, a number of the arc sections 177 is four, and a number of the line sections 178 is four.

In FIG. 1H and FIG. 1I, the image-side assembled element 160 may be made of a black plastic material by an injection molding method, and the outer annular surface of the image-side assembled element 160 includes at least two gate traces 169. Therefore, it is favorable for reducing the occurrence probability of insufficiently filling and the uneven surface during an injection molding process of the image-side assembled element 160. In the 1st embodiment, a number of the gate traces 169 is two, and the two gate traces 169 are symmetrical with respect to the optical axis z.

In FIG. 1A, FIG. 1B and FIG. 1D, the imaging lens module 100 may further include a light blocking sheet 150 disposed between the plastic barrel 110 and the annular wall 163a of the inner protruding portion 162 of the image-side assembled element 160. An object-side surface 150a of the light blocking sheet 150 is abutted with the plastic barrel 110, and an image-side surface 150b of the light blocking sheet 150 is abutted with the annular wall 163a. Therefore, the stray light from and around contacting positions (among the first contacting surface 115, the second contacting surface 165, the glue groove 121 and the glue material 122)

between the plastic barrel 110 and the image-side assembled element 160 can be effectively blocked.

Figure 1K:
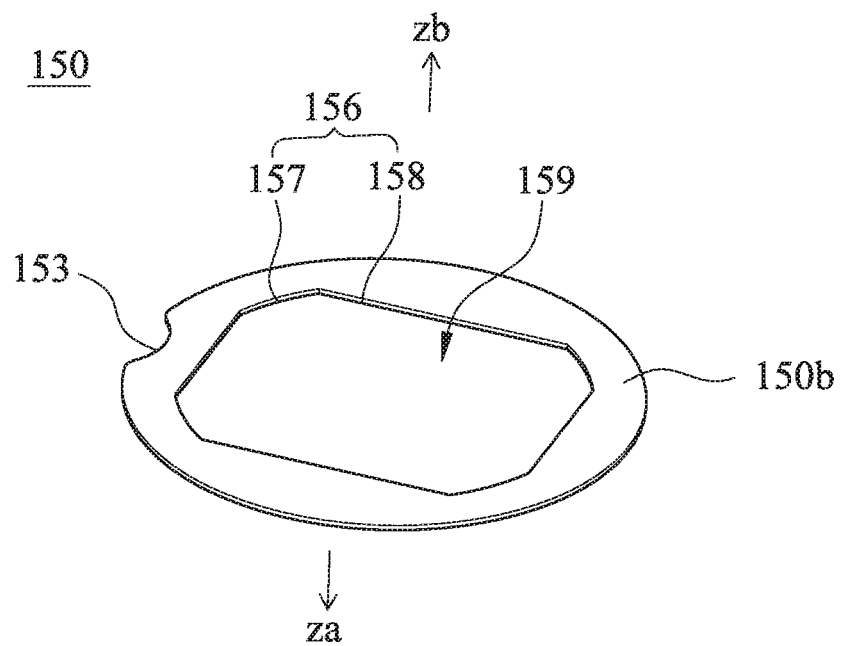
FIG. 1K is a three-dimensional view of a light blocking sheet of the 1st embodiment.
Figure 1L:
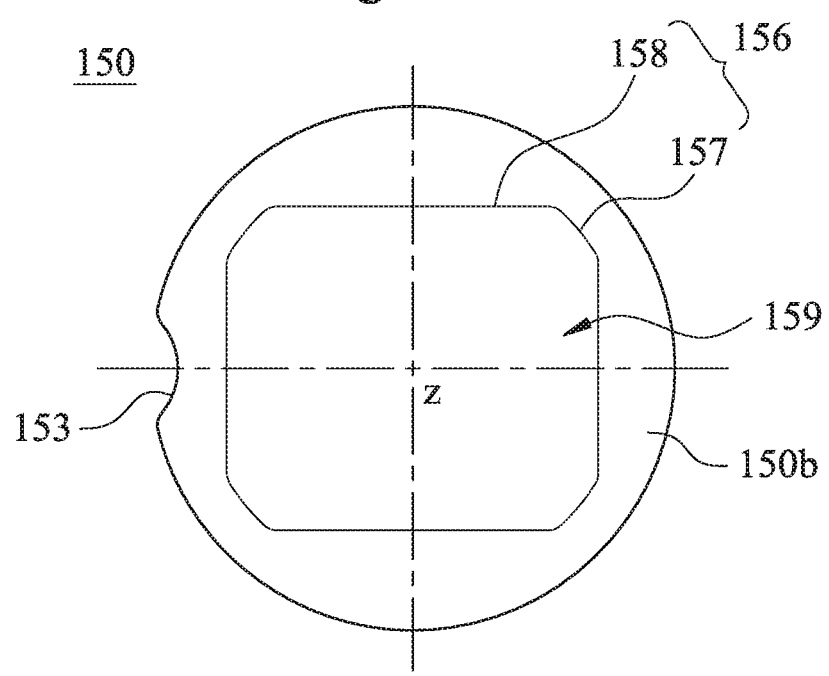
FIG. 1L is a side view of the light blocking sheet of the 1st embodiment.

FIG. 1K is a three-dimensional view of the light blocking sheet 150 of the 1st embodiment. FIG. 1L is a side view of the light blocking sheet 150 of the 1st embodiment. In FIG. 1D, FIG. 1K and FIG. 1L, among the light blocking elements 181, 171 and 182 of the light blocking element assembly 180, each of the light blocking elements 181 and 182 is a light blocking sheet. Among the light blocking sheet 150 and the light blocking elements 181, 182, which are the light blocking sheets, an inner opening 159 is formed by an inner annular surface 156 of the light blocking sheet 150. The inner opening 159 is in a non-circular shape. The inner annular surface 156 includes a plurality of arc sections 157 and a plurality of line sections 158. The arc sections 157 have the same radius value (i.e., the same curvature radius value) and the same circle center being the optical axis z. The arc sections 157 and the line sections 158 are alternatively arranged along the circumferential direction of the optical axis z, and each of the line sections 158 is connected between two of the arc sections 157. Therefore, at least one of the light blocking sheet 150 and the light blocking elements 181, 182, which are the light blocking sheets, having the aforementioned features is advantageous in enhancing the efficiency of blocking non-imaging light.

Specifically, the light blocking sheet 150 and the light blocking elements 181, 182, which are the light blocking sheets, all have the features aforementioned in the last paragraph. The inner opening 159 is formed by the inner annular surface 156 of the light blocking sheet 150. The inner opening 159 is in the non-circular shape. The inner annular surface 156 includes four arc sections 157 and four line sections 158. The arc sections 157 have the same radius value and the same circle center. The arc sections 157 and the line sections 158 are alternatively arranged along the circumferential direction of the optical axis z. Two ends of each of the line sections 158 are respectively connected to two of the arc sections 157, i.e., two ends of each of the arc sections 157 are respectively connected to two of the line sections 158. An inner opening 1819 is formed by an inner annular surface 1816 of the light blocking element 181. The inner opening 1819 is in a non-circular shape. The inner annular surface 1816 includes four arc sections 1817 and four line sections 1818. The arc sections 1817 have the same radius value and the same circle center. The arc sections 1817 and the line sections 1818 are alternatively arranged along the circumferential direction of the optical axis z. Two ends of each of the line sections 1818 are respectively connected to two of the arc sections 1817, i.e., two ends of each of the arc sections 1817 are respectively connected to two of the line sections 1818. An inner opening 1829 is formed by an inner annular surface 1826 of the light blocking element 182. The inner opening 1829 is in a non-circular shape. The inner annular surface 1826 includes four arc sections 1827 and four line sections 1828. The arc sections 1827 have the same radius value and the same circle center. The arc sections 1827 and the line sections 1828 are alternatively arranged along the circumferential direction of the optical axis z. Two ends of each of the line sections 1828 are respectively connected to two of the arc sections 1827, i.e., two ends of each of the arc sections 1827 are respectively connected to two of the line sections 1828.

In FIG. 1D, FIG. 1I and FIG. 1K, the inner annular surface of the plastic barrel 110 may further include a directional protrusion 123, which protrudes toward the optical axis z and extends along the direction of the optical axis z, i.e., the directional protrusion 123 has a specific thickness along the direction of the optical axis z. An outer annular surface of the light blocking sheet 150 includes a directional notch 153 recessed toward the optical axis z. A position, which is located correspondingly to the inner protruding portion 162, of the outer annular surface of the image-side assembled element 160 includes a directional groove 173, which is recessed toward the optical axis z and extends along the direction of the optical axis z, i.e., the directional groove 173 has a specific recessed distance along the direction of the optical axis z. The directional protrusion 123 is disposed correspondingly to the directional notch 153 and the directional groove 173. Therefore, it is favorable for reducing the warpage occurrence probability of the light blocking sheet 150, providing automatic visual identification and positioning capability during assembling, and raising the assembling efficiency of the imaging lens module 100.

In FIG. 1A and FIG. 1D, the imaging lens module 100 may further include a first retainer 130 disposed in the accommodating space 117 of the plastic barrel 110 and for fixedly disposing the optical lens assembly 140. A glue groove 131 is formed between the plastic barrel 110 and the first retainer 130, and a glue material 132 is disposed in the glue groove 131. Therefore, it is favorable for enhancing the structural stability of the imaging lens module 100 so as to reduce the occurrence probability of space distance changing between the optical elements resulted from the collisions. Specifically, the first retainer 130 is disposed on the object side za with respect to the optical lens assembly 140 and for fixedly disposing the optical lens assembly 140. The glue groove 131 is formed between a recessed section of the inner annular surface of the plastic barrel 110 and an outer surface of the first retainer 130.

A contact surface 113 of the plastic barrel 110 and a contact surface 133 of the first retainer 130 may contact each other. At least one of the contact surface 113 of the plastic barrel 110 and the contact surface 133 of the first retainer 130 (specifically, the contact surface 133 of the first retainer 130) includes a plurality of stripe structures 134. Each of the stripe structures 134 is in a stripe shape (e.g., as the stripe structures 116 shown in FIG. 1E) and extends to the glue groove 131, which is formed between the plastic barrel 110 and the first retainer 130. The stripe structures 134 are regularly arranged along the circumferential direction of the optical axis z. Therefore, it is favorable for increasing the assembling and contacting force between the plastic barrel 110 and the first retainer 130, so as to raise the dispensing efficiency and conveniently manufacture the stripe structures 134 by the injection molding method. In the 1st embodiment, the contact surface 113 is located on the inner annular surface of the plastic barrel 110, and the contact surface 133 is located on the outer annular surface of the first retainer 130. Each of the contact surfaces 113, 133 and the glue groove 131 is in two arc shapes corresponding to the same positions on the circumferential direction of the optical axis z. In another embodiment (not shown in drawings) according to the present disclosure, a contact surface of the plastic barrel and a contact surface of the first retainer contact each other and both include a plurality of stripe structures.

The imaging lens module 100 may further include a second retainer 190 disposed in the image-side assembled element 160 and for fixedly disposing the light blocking element assembly 180. A glue groove 191 is formed between the image-side assembled element 160 and the second retainer 190, and a glue material 192 is disposed in the glue groove 191. Therefore, it is favorable for enhancing the structural stability of the imaging lens module 100 so as to reduce the tilt occurrence probability of the optical elements resulted from the collisions. Specifically, the second retainer 190 is disposed on the image side zb with respect to the light blocking element assembly 180 and for fixedly disposing the light blocking element assembly 180. The glue groove 191 is formed between a recessed section of the inner annular surface of the image-side assembled element 160 and an outer annular surface of the second retainer 190.

Furthermore, a contact surface 167 of the image-side assembled element 160 and a contact surface 197 of the second retainer 190 may contact each other. The contact surfaces 167 and 197 extend to the glue groove 191, which is formed between the image-side assembled element 160 and the second retainer 190. Specifically, the contact surface 167 is located on the inner annular surface of the image-side assembled element 160, and the contact surface 197 is located on the outer annular surface of the second retainer 190. Each of the contact surfaces 167, 197 and the glue groove 191 is in two arc shapes corresponding to the same positions on the circumferential direction of the optical axis z.

In FIG. 1B, among the optical lens elements 141, 142, 143, 144 and 145 of the optical lens assembly 140, a distance along the direction of the optical axis z between an object-side surface 141a of the optical lens element 141, which is closest to the object side za thereamong, and an image-side surface 145b of the optical lens element 145, which is closest to the image side zb thereamong, is Td. Among the light blocking elements 181, 171 and 182 of the light blocking element assembly 180, a distance along the direction of the optical axis z between an object-side surface 181a of the light blocking element 181, which is closest to the object side za thereamong, and an image-side surface 182b of the light blocking element 182, which is closest to the image side zb thereamong, is W. The following condition may be satisfied: 0.10<W/Td<0.35. Therefore, the longitudinal depth range in the aforementioned condition is advantageous in enhancing the light blocking efficiency of an image-side end of the imaging lens module 100.

In FIG. 1D, the imaging lens module 100 may further include an optical folding element 101 disposed close to the object-side end 110a of the plastic barrel 110. The object-side end 110a is the end, which is toward the object side za, of the plastic barrel 110. It can be said that the optical folding element 101 is disposed on the object side za with respect to the plastic barrel 110 and the optical lens assembly 140. Therefore, it is favorable for providing the imaging lens module 100 with the feasibility to be disposed in an electronic device in a thin form. Furthermore, the optical folding element 101 may be a prism, a mirror, but not limited thereto. The optical folding element 101 is configured for folding the light into the imaging lens module 100.

The data of the aforementioned parameters of the imaging lens module 100 according to the 1st embodiment of the present disclosure are listed in the following Table 1, and the parameters are also shown in FIG. 1A, FIG. 1B, FIG. 1F and FIG. 1I.

TABLE 1

| 1st Embodiment | | | |
|---|---|---|---|
| L1 (mm) | 7.320 | φ1 (mm) | 3.110 |
| L2 (mm) | 1.838 | φ2 (mm) | 2.700 |
| L1/L2 | 3.98 | φ2/φ1 | 0.87 |
| N | 120 | Td (mm) | 6.300 |
| d (mm) | 0.319 | W (mm) | 0.809 |

TABLE 1-continued

| 1st Embodiment | | | |
|---|---|---|---|
| D (mm) | 1.900 | W/Td | 0.13 |
| d/D | 0.17 | | |

2nd Embodiment

Figure 2A:
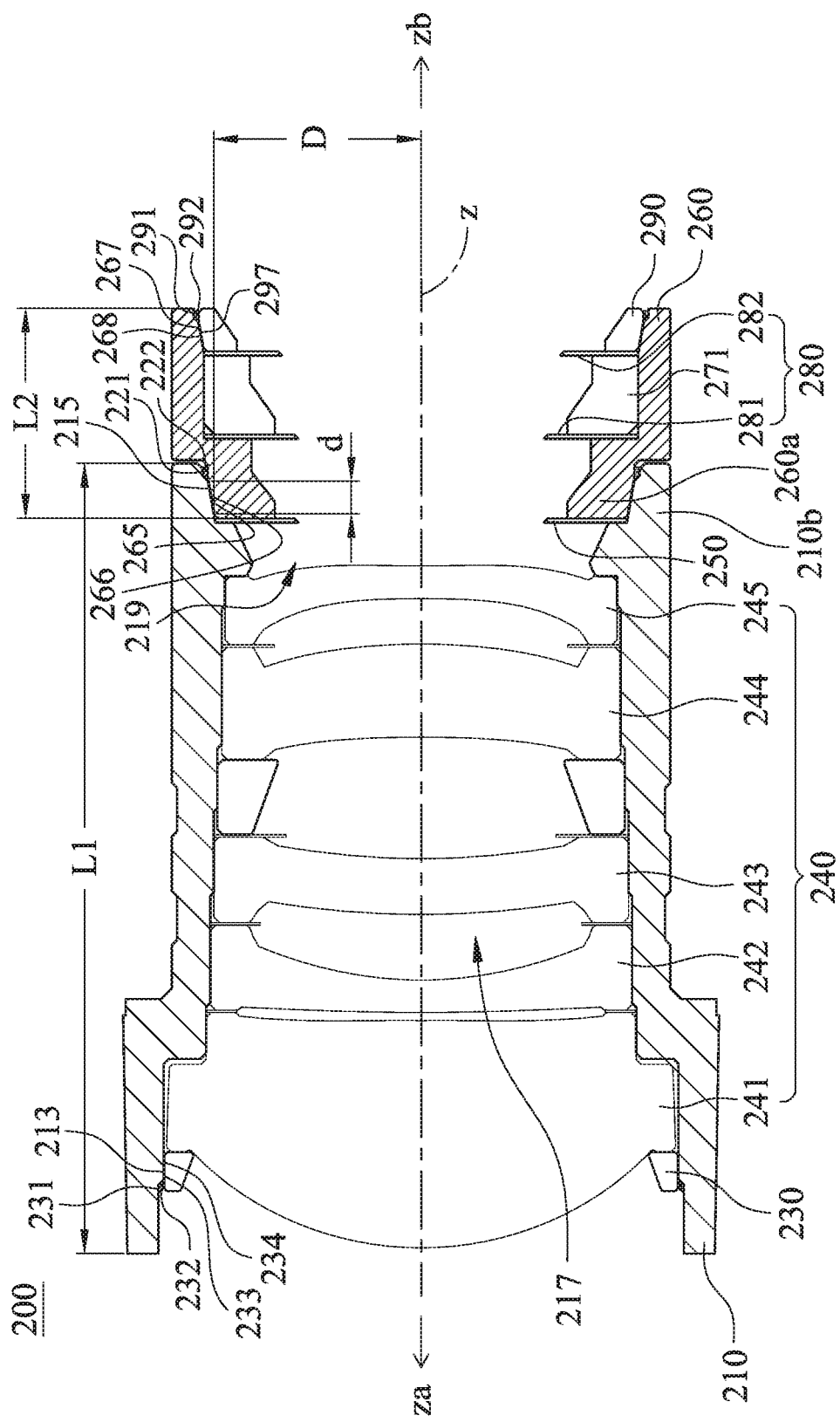
FIG. 2A is a schematic view of an imaging lens module according to the 2nd embodiment of the present disclosure.
Figure 2B:
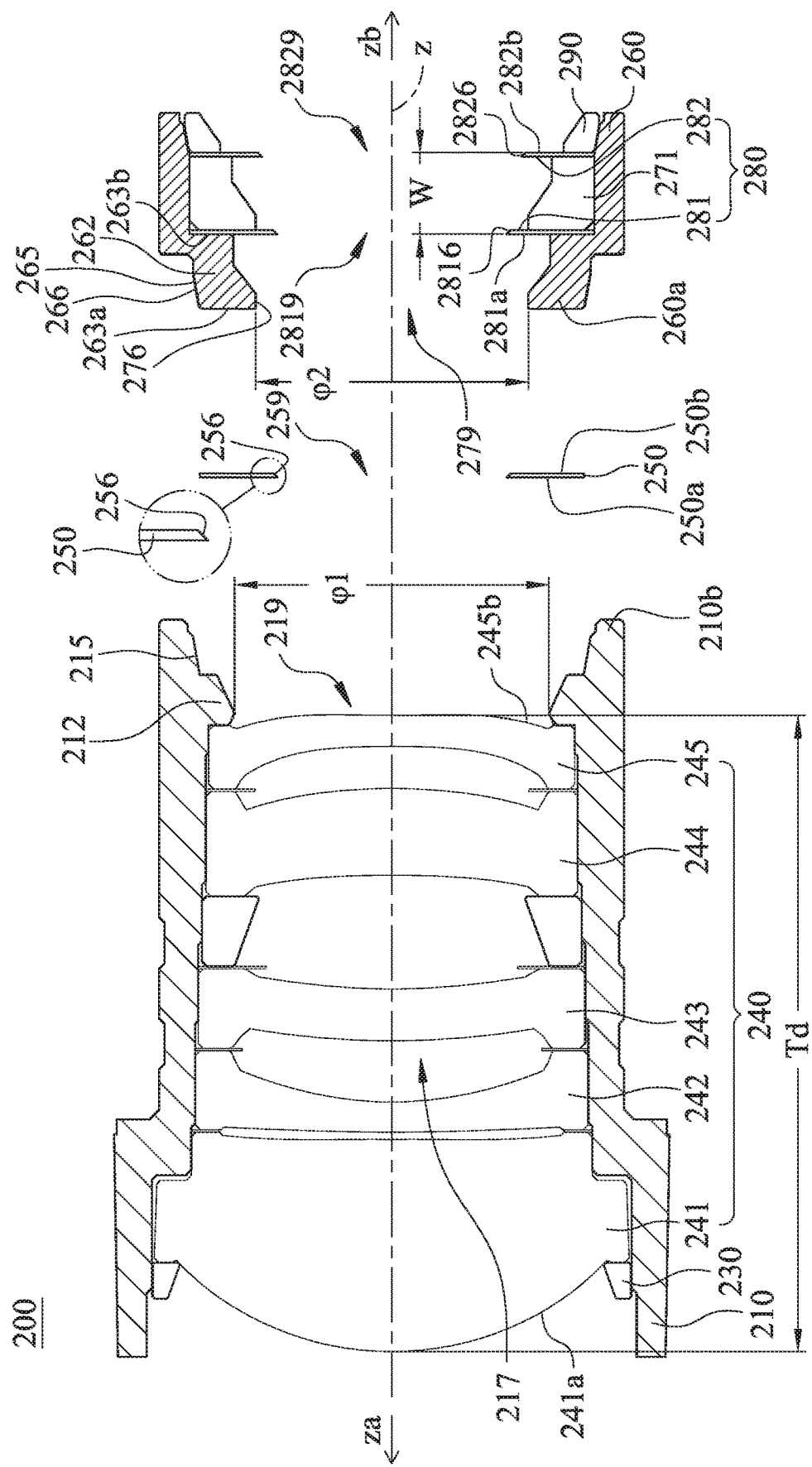
FIG. 2B is an exploded view of the imaging lens module according to FIG. 2A.

FIG. 2A is a schematic view of an imaging lens module 200 according to the 2nd embodiment of the present disclosure. FIG. 2B is an exploded view of the imaging lens module 200 according to FIG. 2A. In FIG. 2A and FIG. 2B, the imaging lens module 200 has an optical axis z, an object side za and an image side zb. The imaging lens module 200 includes a plastic barrel 210, an optical lens assembly 240, an image-side assembled element 260 and a light blocking element assembly 280.

Figure 2C:
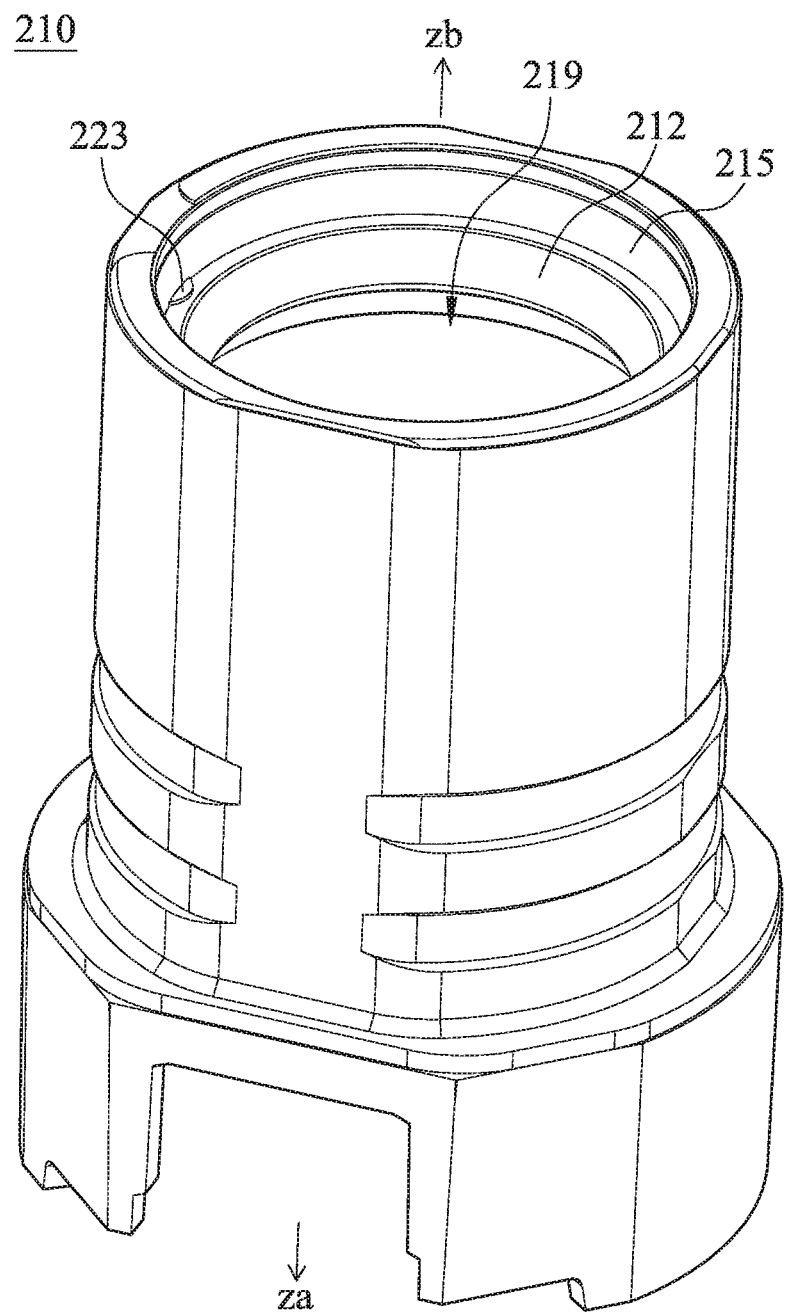
FIG. 2C is a three-dimensional view of a plastic barrel of the 2nd embodiment.

FIG. 2C is a three-dimensional view of the plastic barrel 210 of the 2nd embodiment. In FIG. 2A to FIG. 2C, the plastic barrel 210 surrounds the optical axis z to form an accommodating space 217 and includes a first contacting surface 215, which is close to an image-side end 210b of the plastic barrel 210. The plastic barrel 210 is in a tube shape and extends from the object side za to the image side zb. The plastic barrel 210 further includes an inner protruding portion 212, which extends toward the optical axis z, and a minimum opening 219 of the plastic barrel 210 is located at the inner protruding portion 212. The optical lens assembly 240 is disposed in the accommodating space 217 of the plastic barrel 210 and includes optical lens elements 241, 242, 243, 244 and 245, in order from the object side za to the image side zb.

Figure 2D:
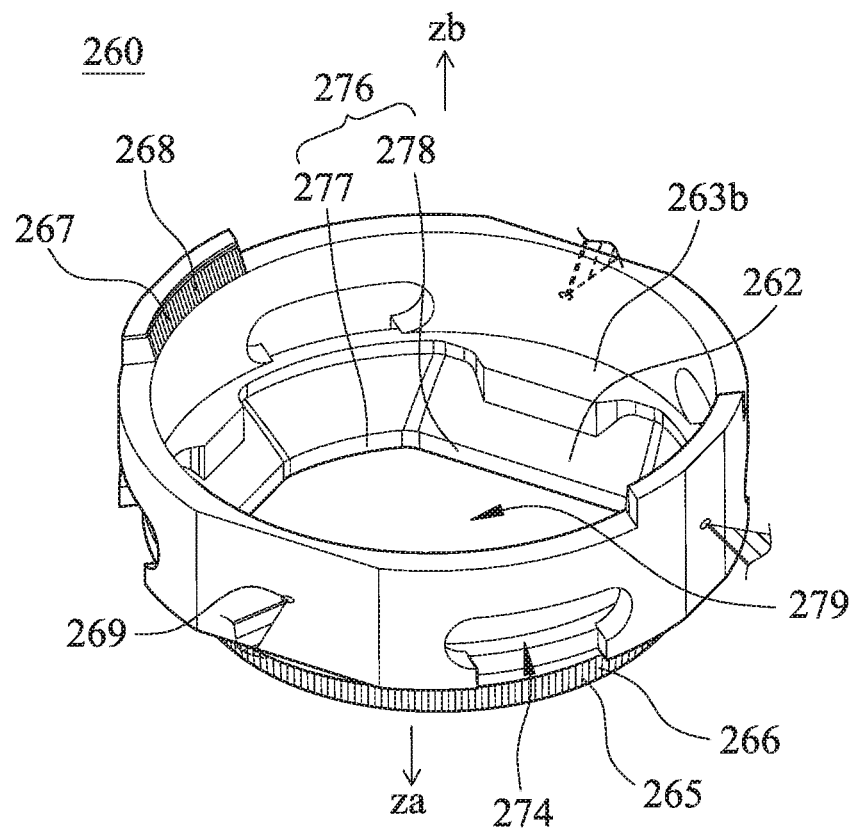
FIG. 2D is a three-dimensional view of an image-side assembled element of the 2nd embodiment.

FIG. 2D is a three-dimensional view of the image-side assembled element 260 of the 2nd embodiment. In FIG. 2A, FIG. 2B and FIG. 2D, the image-side assembled element 260 is disposed close and connected to the image-side end 210b of the plastic barrel 210. The image-side assembled element 260 is in a tube shape and extends from the object side za to the image side zb, and the image-side assembled element 260 surrounds the optical axis z and is disposed coaxially with the plastic barrel 210. The image-side assembled element 260 includes a second contacting surface 265 and an inner protruding portion 262. The second contacting surface 265 is disposed close to an object-side end 260a of the image-side assembled element 260 and correspondingly to the first contacting surface 215. The inner protruding portion 262 extends toward the optical axis z, and a minimum opening 279 of the image-side assembled element 260 is located at the inner protruding portion 262.

The light blocking element assembly 280 is disposed in the image-side assembled element 260 and includes light blocking elements 281, 271 and 282, in order from the object side za to the image side zb. The light blocking element 281 is abutted with an annular wall 263b of the inner protruding portion 262. In the 2nd embodiment, each of the light blocking elements 281 and 282 is a light blocking sheet, the light blocking element 271 is a spacer, and the light blocking element 271 is disposed between the light blocking elements 281 and 282. The inner protruding portion 262 of the image-side assembled element 260 includes annular walls 263a and 263b. A normal direction of the annular wall 263a and a normal direction of the annular wall 263b are both parallel to the optical axis z.

In FIG. 2A, the plastic barrel 210 and the image-side assembled element 260 both in the tube shapes contact each other via the first contacting surface 215 and the second contacting surface 265 to be disposed coaxially with respect to the optical axis z. Specifically, the first contacting surface 215 is located at an inner annular surface of the plastic barrel 210. The second contacting surface 265 is located at an outer annular surface of the image-side assembled element 260.

In detail, a glue groove 221 is formed between the plastic barrel 210 and the image-side assembled element 260. A glue material 222 is disposed in the glue groove 221. In the 2nd embodiment, the glue groove 221 is formed between a recessed section of the inner annular surface of the plastic barrel 210 and the outer annular surface of the image-side assembled element 260. The image-side assembled element 260 includes at least two annular side openings 274, so that the glue groove 221 between the plastic barrel 210 and the image-side assembled element 260 is connected to the outside of the imaging lens module 200.

In FIG. 2A and FIG. 2D, the first contacting surface 215 and the second contacting surface 265 contact each other. The second contacting surface 265 includes a plurality of stripe structures 266. Each of the stripe structures 266 is in a stripe shape and extends to the glue groove 221 between the plastic barrel 210 and the image-side assembled element 260. The stripe structures 266 are regularly arranged along a circumferential direction of the optical axis z. In the 2nd embodiment, each of the first contacting surface 215, the second contacting surface 265 and the glue groove 221 is in an annular shape around the optical axis z.

In FIG. 2D, the minimum opening 279 is formed by a minimum inner annular surface 276 of the image-side assembled element 260. The minimum opening 279 is in a non-circular shape. The minimum inner annular surface 276 includes four arc sections 277 and four line sections 278. The arc sections 277 have the same radius value and the same circle center. The arc sections 277 and the line sections 278 are alternatively arranged along the circumferential direction of the optical axis z. Two ends of each of the line sections 278 are respectively connected to two of the arc sections 277, i.e., two ends of each of the arc sections 277 are respectively connected to two of the line sections 278.

The image-side assembled element 260 is made of a black plastic material by an injection molding method, and the outer annular surface of the image-side assembled element 260 includes at least three gate traces 269. Therefore, it is favorable for increasing the completeness of the surface structure of the image-side assembled element 260, so as to raise the success rate and the production quality of the product made by the injection molding method. In the 2nd embodiment, a number of the gate traces 269 is three, as shown in FIG. 2D.

Figure 2E:
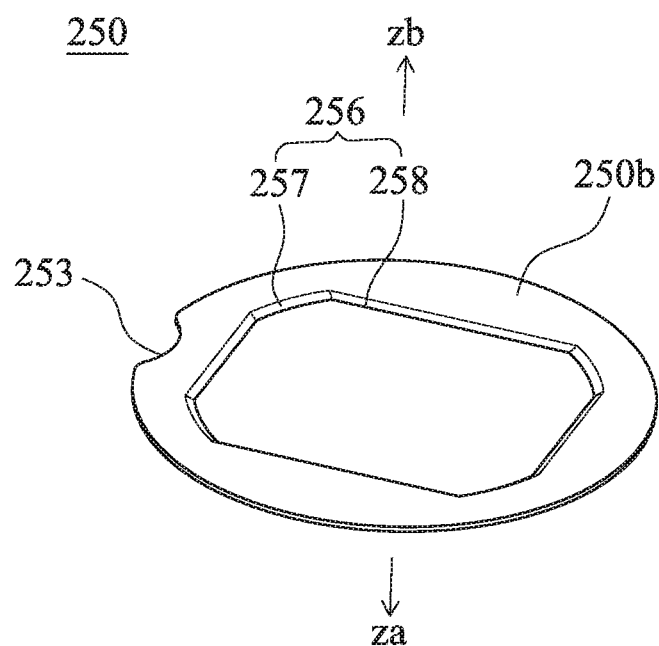
FIG. 2E is a three-dimensional view of a light blocking sheet of the 2nd embodiment.

FIG. 2E is a three-dimensional view of a light blocking sheet 250 of the 2nd embodiment. In FIG. 2A, FIG. 2B and FIG. 2E, the imaging lens module 200 further includes the light blocking sheet 250 disposed between the plastic barrel 210 and the annular wall 263a of the inner protruding portion 262 of the image-side assembled element 260. An object-side surface 250a of the light blocking sheet 250 is abutted with the plastic barrel 210, and an image-side surface 250b of the light blocking sheet 250 is abutted with the annular wall 263a.

Among the light blocking elements 281, 271 and 282 of the light blocking element assembly 280, each of the light blocking elements 281 and 282 is a light blocking sheet. Among the light blocking sheet 250 and the light blocking elements 281, 282, which are the light blocking sheets, at least an inner opening 259 of the light blocking sheet 250 is in a non-circular shape. The inner opening 259 is formed by an inner annular surface 256 of the light blocking sheet 250. The inner annular surface 256 includes four arc sections 257 and four line sections 258. The arc sections 257 have the same radius value and the same circle center. The arc sections 257 and the line sections 258 are alternatively arranged along the circumferential direction of the optical axis z. Two ends of each of the line sections 258 are respectively connected to two of the arc sections 257, i.e., two ends of each of the arc sections 257 are respectively connected to two of the line sections 258.

Among the light blocking sheet 250 and the light blocking elements 281, 282, which are the light blocking sheets, the inner opening 259 is formed by the inner annular surface 256 of the light blocking sheet 250. The inner annular surface 256 has a chamfering structure, and the inner annular surface 256 is tapered from the image side zb to the object side za or from the object side za to the image side zb. Therefore, at least one of the light blocking sheet 250 and the light blocking elements 281, 282, which are the light blocking sheets, having the aforementioned features is advantageous in reducing the occurrence probability of the extra stray light.

Specifically, the light blocking sheet 250 and the light blocking elements 281, 282, which are the light blocking sheets, all have the features aforementioned in the last paragraph. The inner annular surface 256 is tapered from the image side zb to the object side za, and the inner opening 259 is formed by the inner annular surface 256 being the chamfering structure. Each of the arc sections 257 being an inclined arc surface of the inner annular surface 256 is tapered from the image side zb to the object side za, and each of the line sections 258 being an inclined surface of the inner annular surface 256 is tapered from the image side zb to the object side za. An inner opening 2819 is formed by an inner annular surface 2816 of the light blocking element 281. The inner annular surface 2816 has a chamfering structure, and the inner annular surface 2816 is tapered from the image side zb to the object side za. An inner opening 2829 is formed by an inner annular surface 2826 of the light blocking element 282. The inner annular surface 2826 has a chamfering structure, and the inner annular surface 2826 is tapered from the image side zb to the object side za.

In FIG. 2A, FIG. 2C and FIG. 2E, the inner annular surface of the plastic barrel 210 further includes a directional protrusion 223, which protrudes toward the optical axis z and extends along the direction of the optical axis z. An outer annular surface of the light blocking sheet 250 includes a directional notch 253 recessed toward the optical axis z. A position, which is located correspondingly to the inner protruding portion 262, of the outer annular surface of the image-side assembled element 260 includes a directional groove, which is recessed toward the optical axis z and extends along the direction of the optical axis z. The directional protrusion 223 is disposed correspondingly to the directional notch 253 and the directional groove.

In FIG. 2A to FIG. 2C, the imaging lens module 200 further includes a first retainer 230 disposed in the accommodating space 217 of the plastic barrel 210 and for fixedly disposing the optical lens assembly 240. A glue groove 231 is formed between the plastic barrel 210 and the first retainer 230, and a glue material 232 is disposed in the glue groove 231. Specifically, the first retainer 230 is disposed on the object side za with respect to the optical lens assembly 240 and for fixedly disposing the optical lens assembly 240. The glue groove 231 is formed between a recessed section of the inner annular surface of the plastic barrel 210 and an outer surface of the first retainer 230.

A contact surface 213 of the plastic barrel 210 and a contact surface 233 of the first retainer 230 contact each other. The contact surface 233 of the first retainer 230 includes a plurality of stripe structures 234. Each of the stripe structures 234 is in a stripe shape and extends to the glue groove 231, which is formed between the plastic barrel 210 and the first retainer 230. The stripe structures 234 are regularly arranged along the circumferential direction of the optical axis z. In the 2nd embodiment, the contact surface 213 is located on the inner annular surface of the plastic barrel 210, and the contact surface 233 is located on the outer annular surface of the first retainer 230. Each of the contact surfaces 213, 233 and the glue groove 231 is in two arc shapes corresponding to the same positions on the circumferential direction of the optical axis z.

In FIG. 2A, FIG. 2B and FIG. 2D, the imaging lens module 200 further includes a second retainer 290 disposed in the image-side assembled element 260 and for fixedly disposing the light blocking element assembly 280. A glue groove 291 is formed between the image-side assembled element 260 and the second retainer 290, and a glue material 292 is disposed in the glue groove 291. Specifically, the second retainer 290 is disposed on the image side zb with respect to the light blocking element assembly 280 and for fixedly disposing the light blocking element assembly 280. The glue groove 291 is formed between a recessed section of the inner annular surface of the image-side assembled element 260 and an outer annular surface of the second retainer 290.

A contact surface 267 of the image-side assembled element 260 and a contact surface 297 of the second retainer 290 contact each other. At least one of the contact surface 267 of the image-side assembled element 260 and the contact surface 297 of the second retainer 290 (specifically, the contact surface 267 of the image-side assembled element 260) includes a plurality of stripe structures 268. Each of the stripe structures 268 is in a stripe shape and extends to the glue groove 291, which is formed between the image-side assembled element 260 and the second retainer 290. The stripe structures 268 are regularly arranged along the circumferential direction of the optical axis z. Therefore, it is favorable for increasing the assembling and contacting force between the image-side assembled element 260 and the second retainer 290, so as to raise the dispensing efficiency and conveniently manufacture the stripe structures 268 by the injection molding method. Specifically, the contact surface 267 is located on the inner annular surface of the image-side assembled element 260, and the contact surface 297 is located on the outer annular surface of the second retainer 290. Each of the contact surfaces 267, 297 and the glue groove 291 is in two arc shapes corresponding to the same positions on the circumferential direction of the optical axis z. In another embodiment (not shown in drawings) according to the present disclosure, a contact surface of the image-side assembled element and a contact surface of the second retainer contact each other and both include a plurality of stripe structures.

In FIG. 2B, among the optical lens elements 241, 242, 243, 244 and 245 of the optical lens assembly 240, a distance along the direction of the optical axis z between an object-side surface 241a of the optical lens element 241, which is closest to the object side za thereamong, and an image-side surface 245b of the optical lens element 245, which is closest to the image side zb thereamong, is Td. Among the light blocking elements 281, 271 and 282 of the light blocking element assembly 280, a distance along the direction of the optical axis z between an object-side surface 281a of the light blocking element 281, which is closest to the object side za thereamong, and an image-side surface 282b of the light blocking element 282, which is closest to the image side zb thereamong, is W.

The data of the parameters of the imaging lens module 200 according to the 2nd embodiment of the present disclosure are listed in the following Table 2, and the parameters are also shown as FIG. 2A and FIG. 2B. The definitions of these parameters shown in Table 2 are the same as those stated in the imaging lens module 100 according to the 1st embodiment.

TABLE 2

| 2nd Embodiment | | | |
|---|---|---|---|
| L1 (mm) | 7.300 | φ1 (mm) | 3.110 |
| L2 (mm) | 1.938 | φ2 (mm) | 2.700 |
| L1/L2 | 3.77 | φ2/φ1 | 0.87 |
| N | 90 | Td (mm) | 6.300 |
| d (mm) | 0.301 | W (mm) | 0.809 |
| D (mm) | 1.914 | W/Td | 0.13 |
| d/D | 0.16 | | |

3rd Embodiment

Figure 3A:
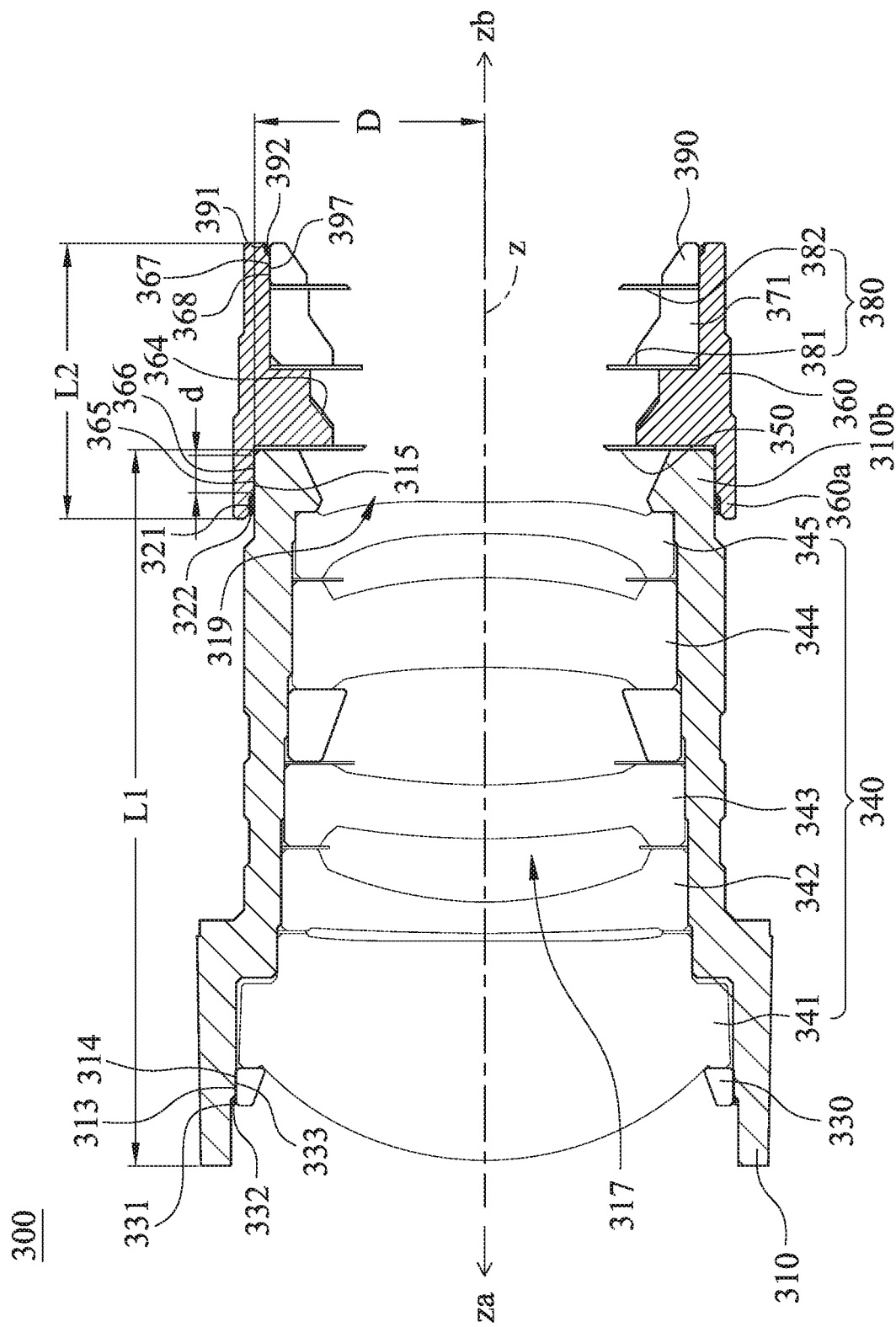
FIG. 3A is a schematic view of an imaging lens module according to the 3rd embodiment of the present disclosure.
Figure 3B:
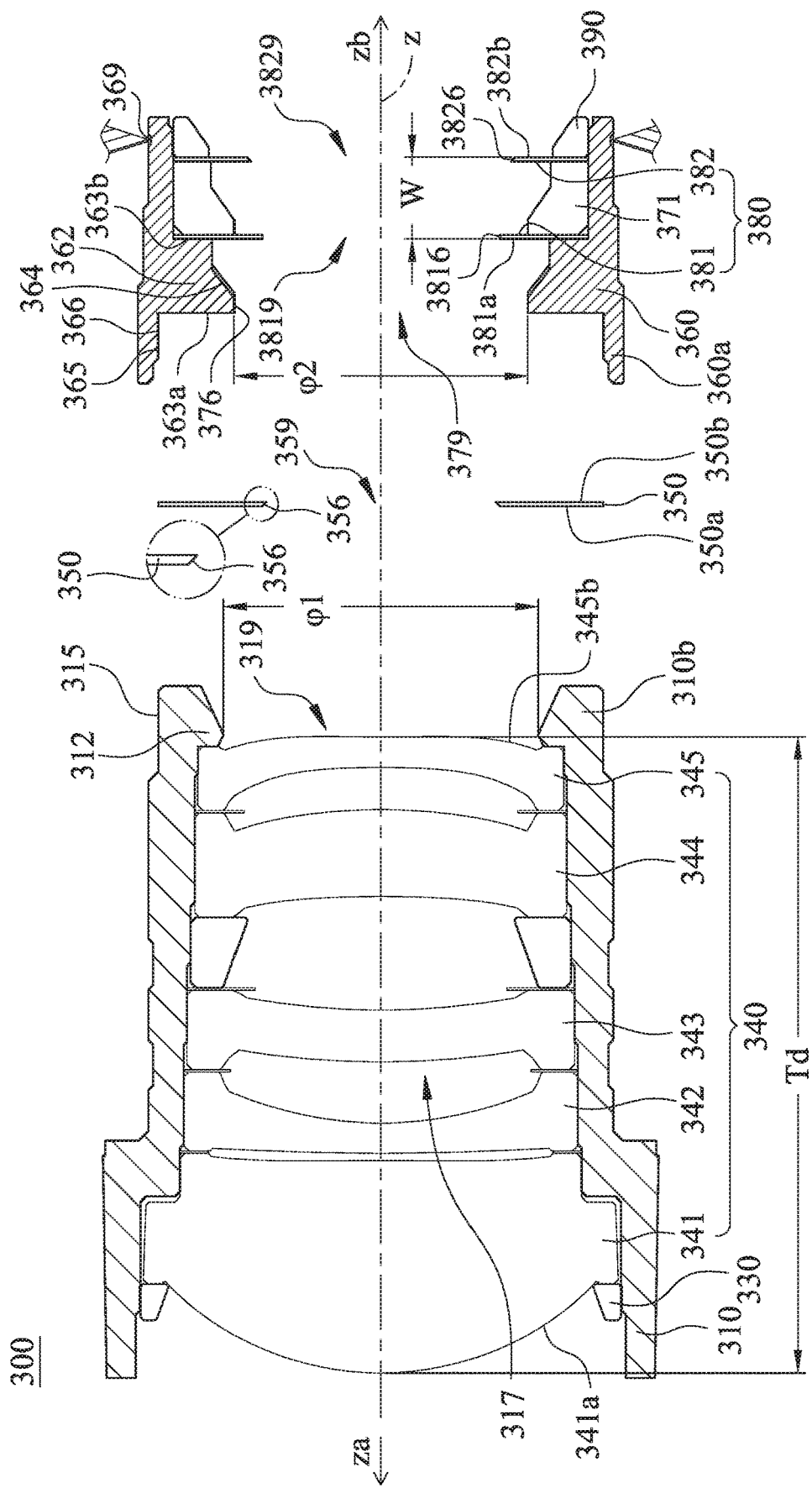
FIG. 3B is an exploded view of the imaging lens module according to FIG. 3A.

FIG. 3A is a schematic view of an imaging lens module 300 according to the 3rd embodiment of the present disclosure. FIG. 3B is an exploded view of the imaging lens module 300 according to FIG. 3A. In FIG. 3A and FIG. 3B, the imaging lens module 300 has an optical axis z, an object side za and an image side zb. The imaging lens module 300 includes a plastic barrel 310, an optical lens assembly 340, an image-side assembled element 360 and a light blocking element assembly 380.

The plastic barrel 310 surrounds the optical axis z to form an accommodating space 317 and includes a first contacting surface 315, which is close to an image-side end 310b of the plastic barrel 310. The plastic barrel 310 is in a tube shape and extends from the object side za to the image side zb. The plastic barrel 310 further includes an inner protruding portion 312, which extends toward the optical axis z, and a minimum opening 319 of the plastic barrel 310 is located at the inner protruding portion 312. The optical lens assembly 340 is disposed in the accommodating space 317 of the plastic barrel 310 and includes optical lens elements 341, 342, 343, 344 and 345, in order from the object side za to the image side zb.

The image-side assembled element 360 is disposed close and connected to the image-side end 310b of the plastic barrel 310. The image-side assembled element 360 is in a tube shape and extends from the object side za to the image side zb, and the image-side assembled element 360 surrounds the optical axis z and is disposed coaxially with the plastic barrel 310. The image-side assembled element 360 includes a second contacting surface 365 and an inner protruding portion 362. The second contacting surface 365 is disposed close to an object-side end 360a of the image-side assembled element 360 and correspondingly to the first contacting surface 315. The inner protruding portion 362 extends toward the optical axis z, and a minimum opening 379 of the image-side assembled element 360 is located at the inner protruding portion 362.

The light blocking element assembly 380 is disposed in the image-side assembled element 360 and includes light blocking elements 381, 371 and 382, in order from the object side za to the image side zb. The light blocking element 381 is abutted with an annular wall 363b of the inner protruding portion 362. In the 3rd embodiment, each of the light blocking elements 381 and 382 is a light blocking sheet, the light blocking element 371 is a spacer, and the light blocking element 371 is disposed between the light blocking elements 381 and 382. The inner protruding portion 362 of the image-side assembled element 360 includes annular walls 363a and 363b. A normal direction of the annular wall 363a and a normal direction of the annular wall 363b are both parallel to the optical axis z.

In FIG. 3A, the plastic barrel 310 and the image-side assembled element 360 both in the tube shapes contact each other via the first contacting surface 315 and the second contacting surface 365 to be disposed coaxially with respect to the optical axis z. Specifically, the first contacting surface 315 is located at an outer annular surface of the plastic barrel 310. The second contacting surface 365 is located at an inner annular surface of the image-side assembled element 360.

In detail, a glue groove 321 is formed between the plastic barrel 310 and the image-side assembled element 360. A glue material 322 is disposed in the glue groove 321. In the 3rd embodiment, the glue groove 321 is formed between the outer annular surface of the plastic barrel 310 and a recessed section of the inner annular surface of the image-side assembled element 360.

The first contacting surface 315 and the second contacting surface 365 contact each other. The second contacting surface 365 includes a plurality of stripe structures 366. Each of the stripe structures 366 is in a stripe shape and extends to the glue groove 321 between the plastic barrel 310 and the image-side assembled element 360. The stripe structures 366 are regularly arranged along a circumferential direction of the optical axis z.

In FIG. 3B, the image-side assembled element 360 is made of a black plastic material by an injection molding method, and an outer annular surface of the image-side assembled element 360 includes two gate traces 369. The minimum opening 379 is formed by a minimum inner annular surface 376 of the image-side assembled element 360. The minimum opening 379 may be in a non-circular shape.

Figure 3C:
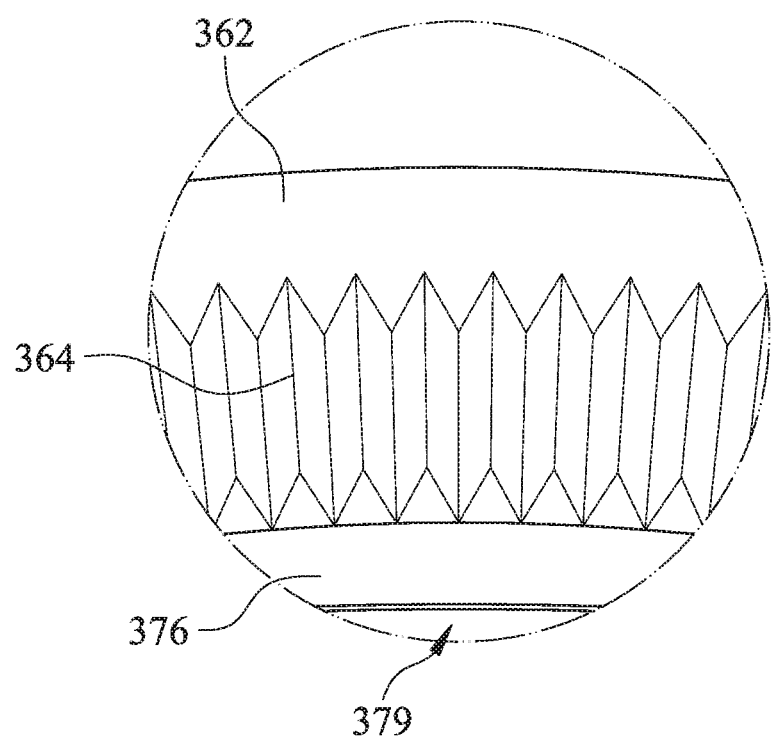
FIG. 3C is a three-dimensional view of a plurality of wedge structures of the 3rd embodiment.

FIG. 3C is a three-dimensional view of a plurality of wedge structures 364 of the 3rd embodiment. In FIG. 3A to FIG. 3C, the inner annular surface of the image-side assembled element 360 includes the wedge structures 364, which are regularly arranged along the circumferential direction of the optical axis z. Each of the wedge structures 364 is tapered toward the optical axis z, i.e., a V-shaped groove is formed between adjacent two of the wedge structures 364. Therefore, it is favorable for the manufacturability of the injection molding method and eliminating the specific light beams. Specifically, the wedge structures 364 are disposed on the inner protruding portion 362.

In FIG. 3A and FIG. 3B, the imaging lens module 300 further includes the light blocking sheet 350 disposed between the plastic barrel 310 and the annular wall 363a of the inner protruding portion 362 of the image-side assembled element 360. An object-side surface 350a of the light blocking sheet 350 is abutted with the plastic barrel 310, and an image-side surface 350b of the light blocking sheet 350 is abutted with the annular wall 363a.

Among the light blocking elements 381, 371 and 382 of the light blocking element assembly 380, each of the light blocking elements 381 and 382 is a light blocking sheet. Among the light blocking sheet 350 and the light blocking elements 381, 382, which are the light blocking sheets, an inner opening 359 is formed by an inner annular surface 356 of the light blocking sheet 350. The inner annular surface 356 has a chamfering structure, and the inner annular surface 356 is tapered from the object side za to the image side zb. An inner opening 3819 is formed by an inner annular surface 3816 of the light blocking element 381. An inner opening 3829 is formed by an inner annular surface 3826 of the light blocking element 382. The inner annular surface 3826 has a chamfering structure, and the inner annular surface 3826 is tapered from the image side zb to the object side za. In addition, at least one of the inner openings 359, 3819 and 3829 may be in a non-circular shape.

The imaging lens module 300 further includes a first retainer 330 disposed in the accommodating space 317 of the plastic barrel 310 and for fixedly disposing the optical lens assembly 340. A glue groove 331 is formed between the plastic barrel 310 and the first retainer 330, and a glue material 332 is disposed in the glue groove 331. Specifically, the first retainer 330 is disposed on the object side za with respect to the optical lens assembly 340 and for fixedly disposing the optical lens assembly 340. The glue groove 331 is formed between a recessed section of the inner annular surface of the plastic barrel 310 and an outer surface of the first retainer 330.

A contact surface 313 of the plastic barrel 310 and a contact surface 333 of the first retainer 330 contact each other. The contact surface 313 of the plastic barrel 310 includes a plurality of stripe structures 314. Each of the stripe structures 314 is in a stripe shape and extends to the glue groove 331, which is formed between the plastic barrel 310 and the first retainer 330. The stripe structures 314 are regularly arranged along the circumferential direction of the optical axis z. In the 3rd embodiment, the contact surface 313 is located on the inner annular surface of the plastic barrel 310, and the contact surface 313 is located on the outer annular surface of the first retainer 330.

The imaging lens module 300 further includes a second retainer 390 disposed in the image-side assembled element 360 and for fixedly disposing the light blocking element assembly 380. A glue groove 391 is formed between the image-side assembled element 360 and the second retainer 390, and a glue material 392 is disposed in the glue groove 391. Specifically, the second retainer 390 is disposed on the image side zb with respect to the light blocking element assembly 380 and for fixedly disposing the light blocking element assembly 380. The glue groove 391 is formed between a recessed section of the inner annular surface of the image-side assembled element 360 and an outer annular surface of the second retainer 390.

A contact surface 367 of the image-side assembled element 360 and a contact surface 397 of the second retainer 390 contact each other. The contact surface 367 of the image-side assembled element 360 includes a plurality of stripe structures 368. Each of the stripe structures 368 is in a stripe shape and extends to the glue groove 391, which is formed between the image-side assembled element 360 and the second retainer 390. The stripe structures 368 are regularly arranged along the circumferential direction of the optical axis z. Specifically, the contact surface 367 is located on the inner annular surface of the image-side assembled element 360, and the contact surface 397 is located on the outer annular surface of the second retainer 390.

In FIG. 3B, among the optical lens elements 341, 342, 343, 344 and 345 of the optical lens assembly 340, a distance along the direction of the optical axis z between an object-side surface 341a of the optical lens element 341, which is closest to the object side za thereamong, and an image-side surface 345b of the optical lens element 345, which is closest to the image side zb thereamong, is Td. Among the light blocking elements 381, 371 and 382 of the light blocking element assembly 380, a distance along the direction of the optical axis z between an object-side surface 381a of the light blocking element 381, which is closest to the object side za thereamong, and an image-side surface 382b of the light blocking element 382, which is closest to the image side zb thereamong, is W.

The data of the parameters of the imaging lens module 300 according to the 3rd embodiment of the present disclosure are listed in the following Table 3, and the parameters are also shown as FIG. 3A and FIG. 3B. The definitions of these parameters shown in Table 3 are the same as those stated in the imaging lens module 100 according to the 1st embodiment.

TABLE 3

| 3rd Embodiment | | | |
|---|---|---|---|
| L1 (mm) | 6.853 | φ1 (mm) | 3.110 |
| L2 (mm) | 2.638 | φ2 (mm) | 2.900 |
| L1/L2 | 2.60 | φ2/φ1 | 0.93 |
| N | 180 | Td (mm) | 6.300 |
| d (mm) | 0.360 | W (mm) | 0.809 |
| D (mm) | 2.200 | W/Td | 0.13 |
| d/D | 0.16 | | |

4th Embodiment

Figure 4A:
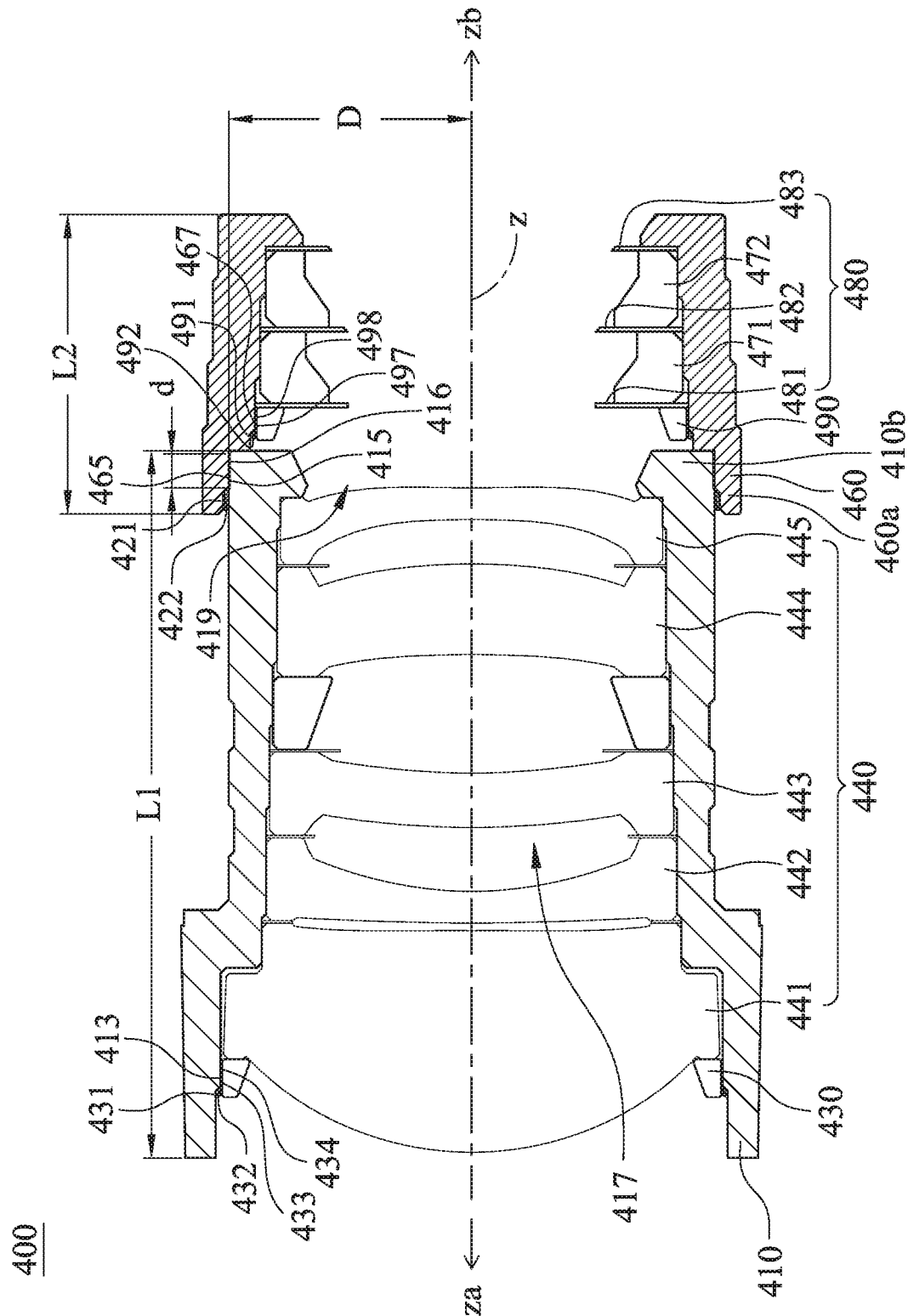
FIG. 4A is a schematic view of an imaging lens module according to the 4th embodiment of the present disclosure.
Figure 4B:
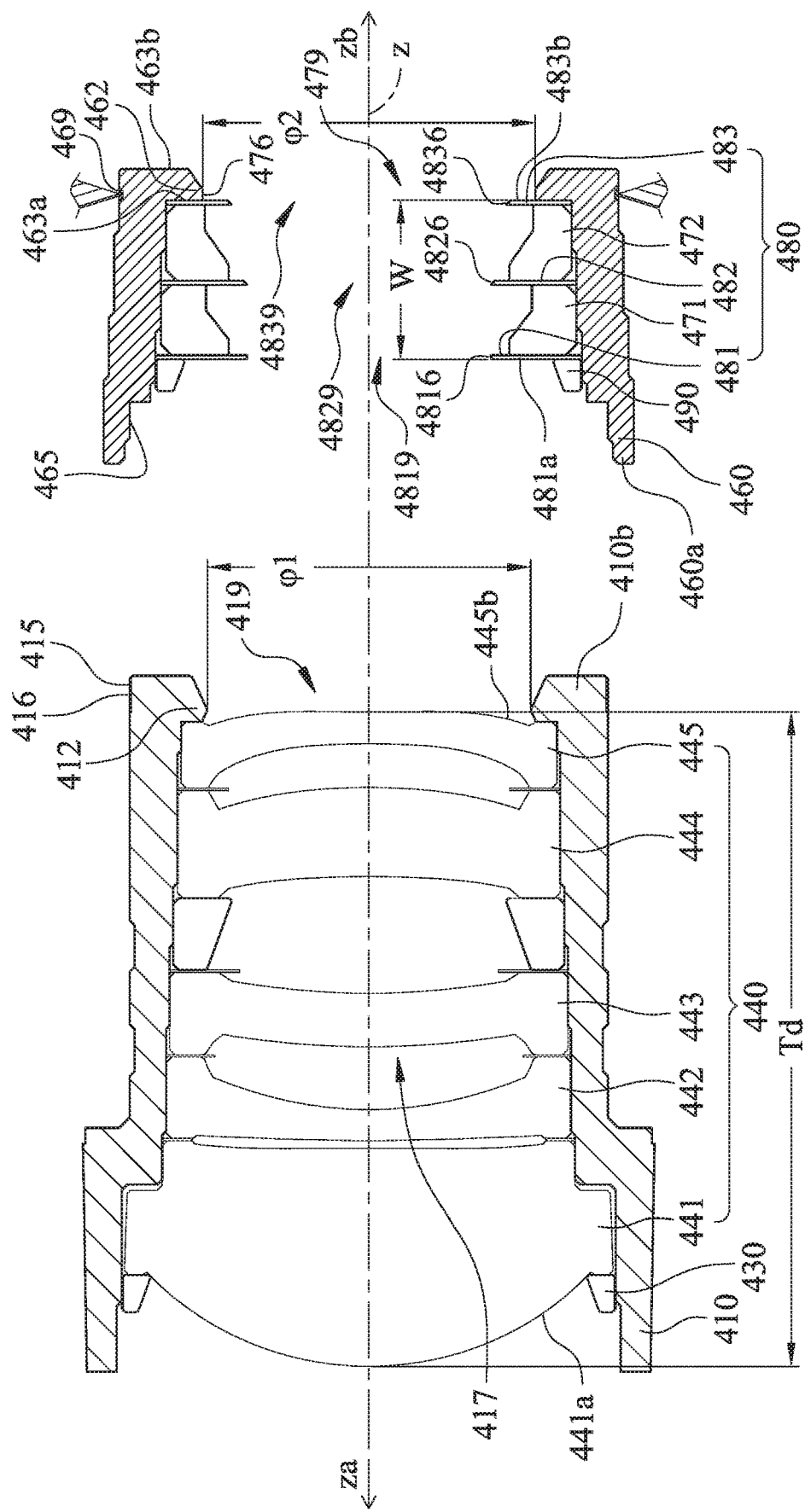
FIG. 4B is an exploded view of the imaging lens module according to FIG. 4A.

FIG. 4A is a schematic view of an imaging lens module 400 according to the 4th embodiment of the present disclosure. FIG. 4B is an exploded view of the imaging lens module 400 according to FIG. 4A. In FIG. 4A and FIG. 4B, the imaging lens module 400 has an optical axis z, an object side za and an image side zb. The imaging lens module 400 includes a plastic barrel 410, an optical lens assembly 440, an image-side assembled element 460 and a light blocking element assembly 480.

Figure 4C:
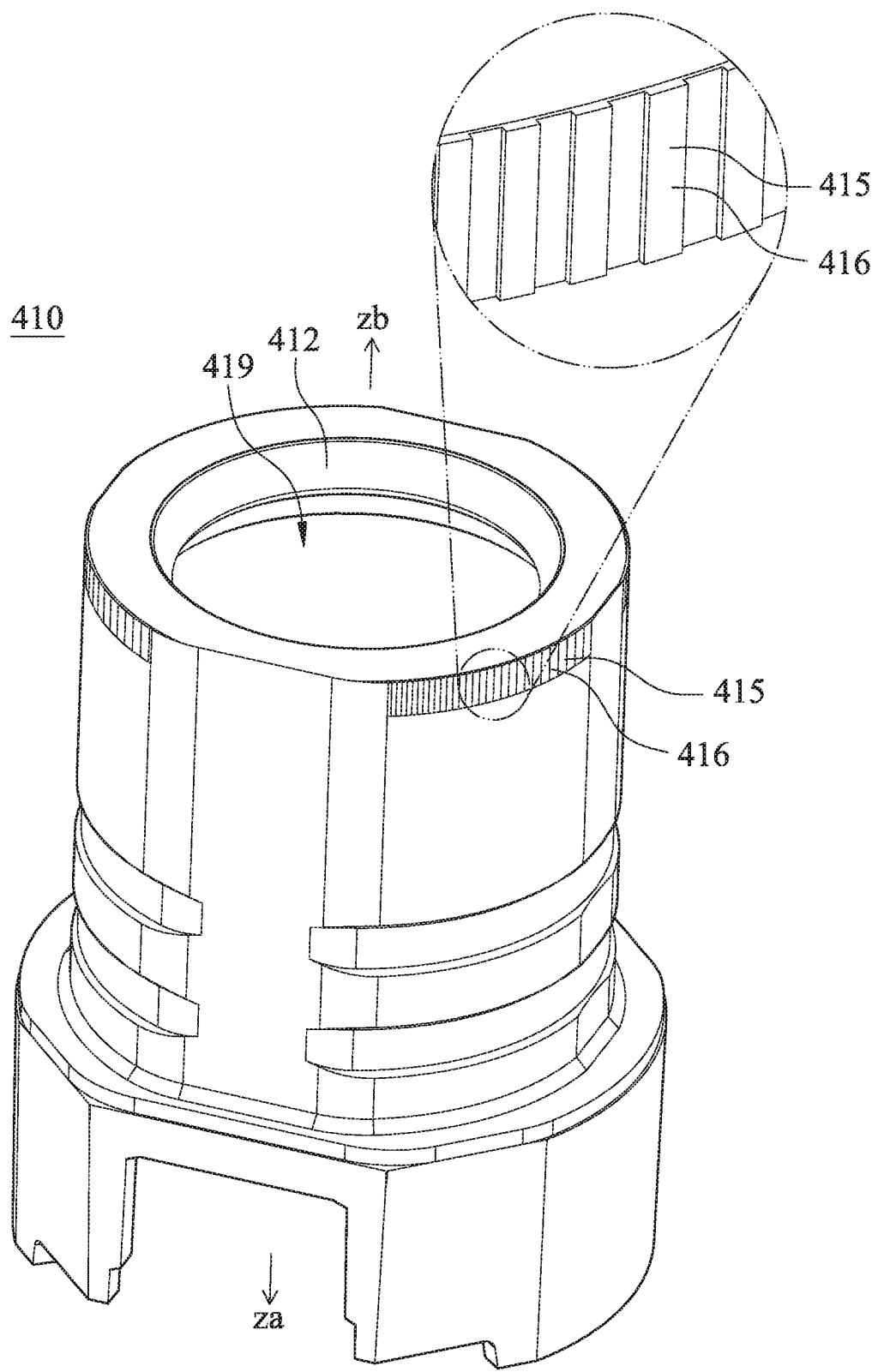
FIG. 4C is a three-dimensional view of a plastic barrel of the 4th embodiment.

FIG. 4C is a three-dimensional view of the plastic barrel 410 of the 4th embodiment. In FIG. 4A to FIG. 4C, the plastic barrel 410 surrounds the optical axis z to form an accommodating space 417 and includes a first contacting surface 415, which is close to an image-side end 410b of the plastic barrel 410. The plastic barrel 410 is in a tube shape and extends from the object side za to the image side zb. The plastic barrel 410 further includes an inner protruding portion 412, which extends toward the optical axis z, and a minimum opening 419 of the plastic barrel 410 is located at the inner protruding portion 412. The optical lens assembly 440 is disposed in the accommodating space 417 of the plastic barrel 410 and includes optical lens elements 441, 442, 443, 444 and 445, in order from the object side za to the image side zb.

In FIG. 4A and FIG. 4B, the image-side assembled element 460 is disposed close and connected to the image-side end 410b of the plastic barrel 410. The image-side assembled element 460 is in a tube shape and extends from the object side za to the image side zb, and the image-side assembled element 460 surrounds the optical axis z and is disposed coaxially with the plastic barrel 410. The image-side assembled element 460 includes a second contacting surface 465 and an inner protruding portion 462. The second contacting surface 465 is disposed close to an object-side end 460a of the image-side assembled element 460 and correspondingly to the first contacting surface 415. The inner protruding portion 462 extends toward the optical axis z, and a minimum opening 479 of the image-side assembled element 460 is located at the inner protruding portion 462.

The light blocking element assembly 480 is disposed in the image-side assembled element 460 and includes light blocking elements 481, 471, 482, 472 and 483, in order from the object side za to the image side zb. The light blocking element 483 is abutted with an annular wall 463a of the inner protruding portion 462. In the 4th embodiment, each of the light blocking elements 481, 482 and 483 is a light blocking sheet, each of the light blocking elements 471 and 472 is a spacer, the light blocking element 471 is disposed between the light blocking elements 481 and 482, and the light blocking element 472 is disposed between the light blocking elements 482 and 483. The inner protruding portion 462 of the image-side assembled element 460 includes annular walls 463a and 463b. A normal direction of the annular wall 463a and a normal direction of the annular wall 463b are both parallel to the optical axis z.

In FIG. 4A, the plastic barrel 410 and the image-side assembled element 460 both in the tube shapes contact each other via the first contacting surface 415 and the second contacting surface 465 to be disposed coaxially with respect to the optical axis z. Specifically, the first contacting surface 415 is located at an outer annular surface of the plastic barrel 410. The second contacting surface 465 is located at an inner annular surface of the image-side assembled element 460.

In detail, a glue groove 421 is formed between the plastic barrel 410 and the image-side assembled element 460. A glue material 422 is disposed in the glue groove 421. In the 4th embodiment, the glue groove 421 is formed between the outer annular surface of the plastic barrel 410 and a recessed section of the inner annular surface of the image-side assembled element 460.

In FIG. 4A to FIG. 4C, the first contacting surface 415 and the second contacting surface 465 contact each other. The first contacting surface 415 includes a plurality of stripe structures 416. Each of the stripe structures 416 is in a stripe shape and extends to the glue groove 421 between the plastic barrel 410 and the image-side assembled element 460. The stripe structures 416 are regularly arranged along a circumferential direction of the optical axis z. In the 4th embodiment, each of the first contacting surface 415, the second contacting surface 465 and the glue groove 421 is in four arc shapes corresponding to the same positions on the circumferential direction of the optical axis z. A sum of the stripe structures 416 of the four arc shapes of the first contacting surface 415 is the parameter N according to the present disclosure.

In FIG. 4B, the image-side assembled element 460 is made of a black plastic material by an injection molding method, and an outer annular surface of the image-side assembled element 460 includes two gate traces 469. The minimum opening 479 is formed by a minimum inner annular surface 476 of the image-side assembled element 460. The minimum opening 479 may be in a non-circular shape.

Among the light blocking elements 481, 471, 482, 472 and 483 of the light blocking element assembly 480, each of the light blocking elements 481, 482 and 483 is a light blocking sheet. An inner opening 4819 is formed by an inner annular surface 4816 of the light blocking element 481. An inner opening 4829 is formed by an inner annular surface 4826 of the light blocking element 482. The inner annular surface 4826 has a chamfering structure, and the inner annular surface 4826 is tapered from the image side zb to the object side za. An inner opening 4839 is formed by an inner annular surface 4836 of the light blocking element 483. The inner annular surface 4836 has a chamfering structure, and the inner annular surface 4836 is tapered from the image side zb to the object side za. In addition, at least one of the inner openings 4819, 4829 and 4839 may be in a non-circular shape.

Figure 4D:
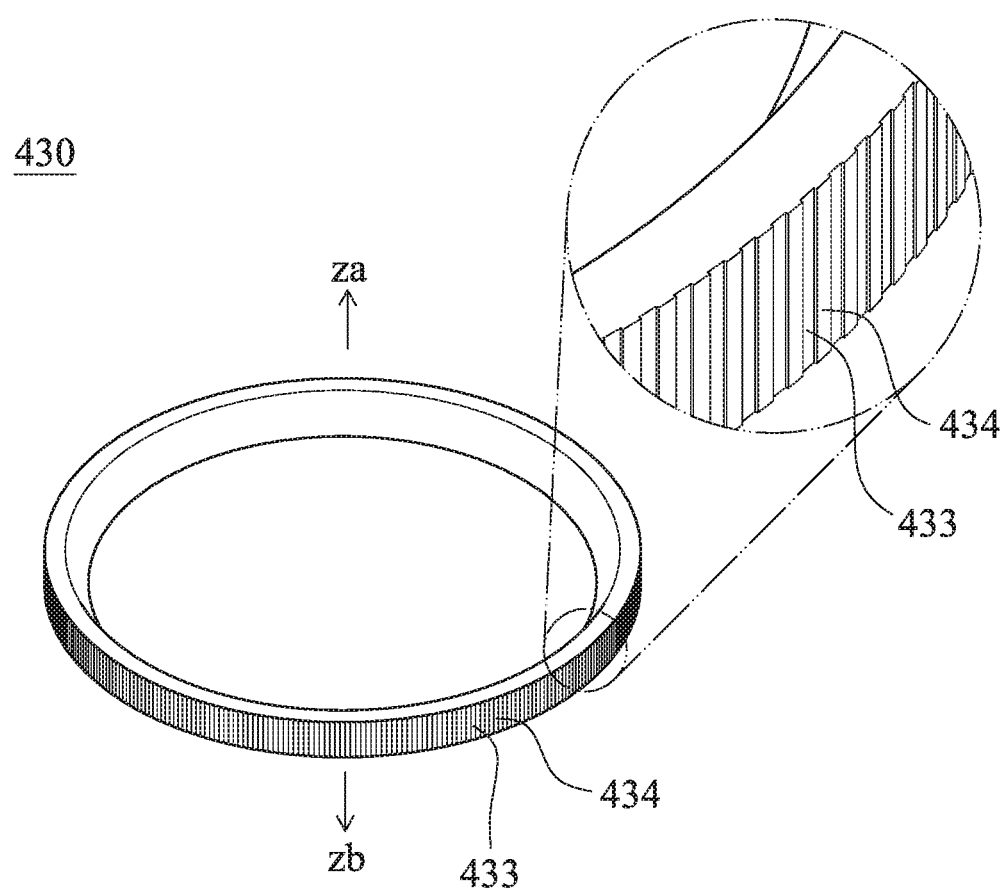
FIG. 4D is a three-dimensional view of a first retainer of the 4th embodiment.

FIG. 4D is a three-dimensional view of a first retainer 430 of the 4th embodiment. In FIG. 4A, FIG. 4B and FIG. 4C, the imaging lens module 400 further includes the first retainer 430 disposed in the accommodating space 417 of the plastic barrel 410 and for fixedly disposing the optical lens assembly 440. A glue groove 431 is formed between the plastic barrel 410 and the first retainer 430, and a glue material 432 is disposed in the glue groove 431. Specifically, the first retainer 430 is disposed on the object side za with respect to the optical lens assembly 440 and for fixedly disposing the optical lens assembly 440. The glue groove 431 is formed between a recessed section of the inner annular surface of the plastic barrel 410 and an outer surface of the first retainer 430.

A contact surface 413 of the plastic barrel 410 and a contact surface 433 of the first retainer 430 contact each other. The contact surface 433 of the first retainer 430 includes a plurality of stripe structures 434. Each of the stripe structures 434 is in a stripe shape and extends to the glue groove 431, which is formed between the plastic barrel 410 and the first retainer 430. The stripe structures 434 are regularly arranged along the circumferential direction of the optical axis z. In the 4th embodiment, the contact surface 413 is located on the inner annular surface of the plastic barrel 410, and the contact surface 433 is located on the outer annular surface of the first retainer 430. Each of the contact surfaces 413, 433 and the glue groove 431 is in two arc shapes corresponding to the same positions on the circumferential direction of the optical axis z.

In FIG. 4A and FIG. 4B, the imaging lens module 400 further includes a second retainer 490 disposed in the image-side assembled element 460 and for fixedly disposing the light blocking element assembly 480. A glue groove 491 is formed between the image-side assembled element 460 and the second retainer 490, and a glue material 492 is disposed in the glue groove 491. Specifically, the second retainer 490 is disposed on the object side za with respect to the light blocking element assembly 480 and for fixedly disposing the light blocking element assembly 480. The glue groove 491 is formed between a recessed section of the inner annular surface of the image-side assembled element 460 and an outer annular surface of the second retainer 490.

A contact surface 467 of the image-side assembled element 460 and a contact surface 497 of the second retainer 490 contact each other. The contact surface 497 of the second retainer 490 includes a plurality of stripe structures 498. Each of the stripe structures 498 is in a stripe shape and extends to the glue groove 491, which is formed between the image-side assembled element 460 and the second retainer 490. The stripe structures 498 are regularly arranged along the circumferential direction of the optical axis z. Specifically, the contact surface 467 is located on the inner annular surface of the image-side assembled element 460, and the contact surface 497 is located on the outer annular surface of the second retainer 490.

In FIG. 4B, among the optical lens elements 441, 442, 443, 444 and 445 of the optical lens assembly 440, a distance along the direction of the optical axis z between an object-side surface 441a of the optical lens element 441, which is closest to the object side za thereamong, and an image-side surface 445b of the optical lens element 445, which is closest to the image side zb thereamong, is Td. Among the light blocking elements 481, 471, 482, 472 and 483 of the light blocking element assembly 480, a distance along the direction of the optical axis z between an object-side surface 481a of the light blocking element 481, which is closest to the object side za thereamong, and an image-side surface 483b of the light blocking element 483, which is closest to the image side zb thereamong, is W.

The data of the parameters of the imaging lens module 400 according to the 4th embodiment of the present disclosure are listed in the following Table 4, and the parameters are also shown as FIG. 4A and FIG. 4B. The definitions of these parameters shown in Table 4 are the same as those stated in the imaging lens module 100 according to the 1st embodiment.

TABLE 4

4th Embodiment

| | | | |
|---|---|---|---|
| L1 (mm) | 6.703 | φ1 (mm) | 3.110 |
| L2 (mm) | 2.838 | φ2 (mm) | 3.200 |
| L1/L2 | 2.36 | φ2/φ1 | 1.03 |
| N | 60 | Td (mm) | 6.300 |
| d (mm) | 0.320 | W (mm) | 1.528 |
| D (mm) | 2.300 | W/Td | 0.24 |
| d/D | 0.14 | | |

5th Embodiment

Figure 5A:
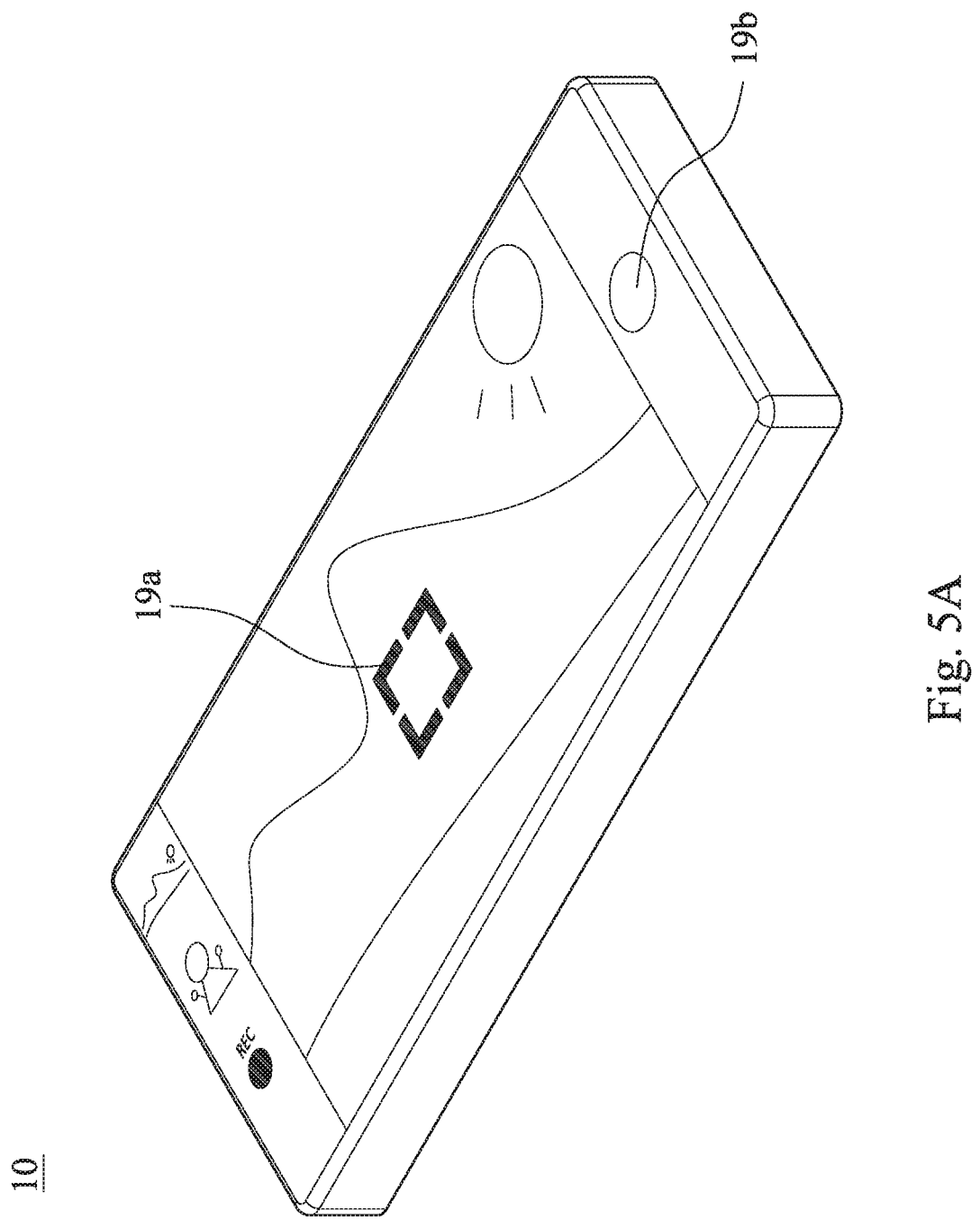
FIG. 5A shows a schematic view of an electronic device according to the 5th embodiment of the present disclosure.
Figure 5B:
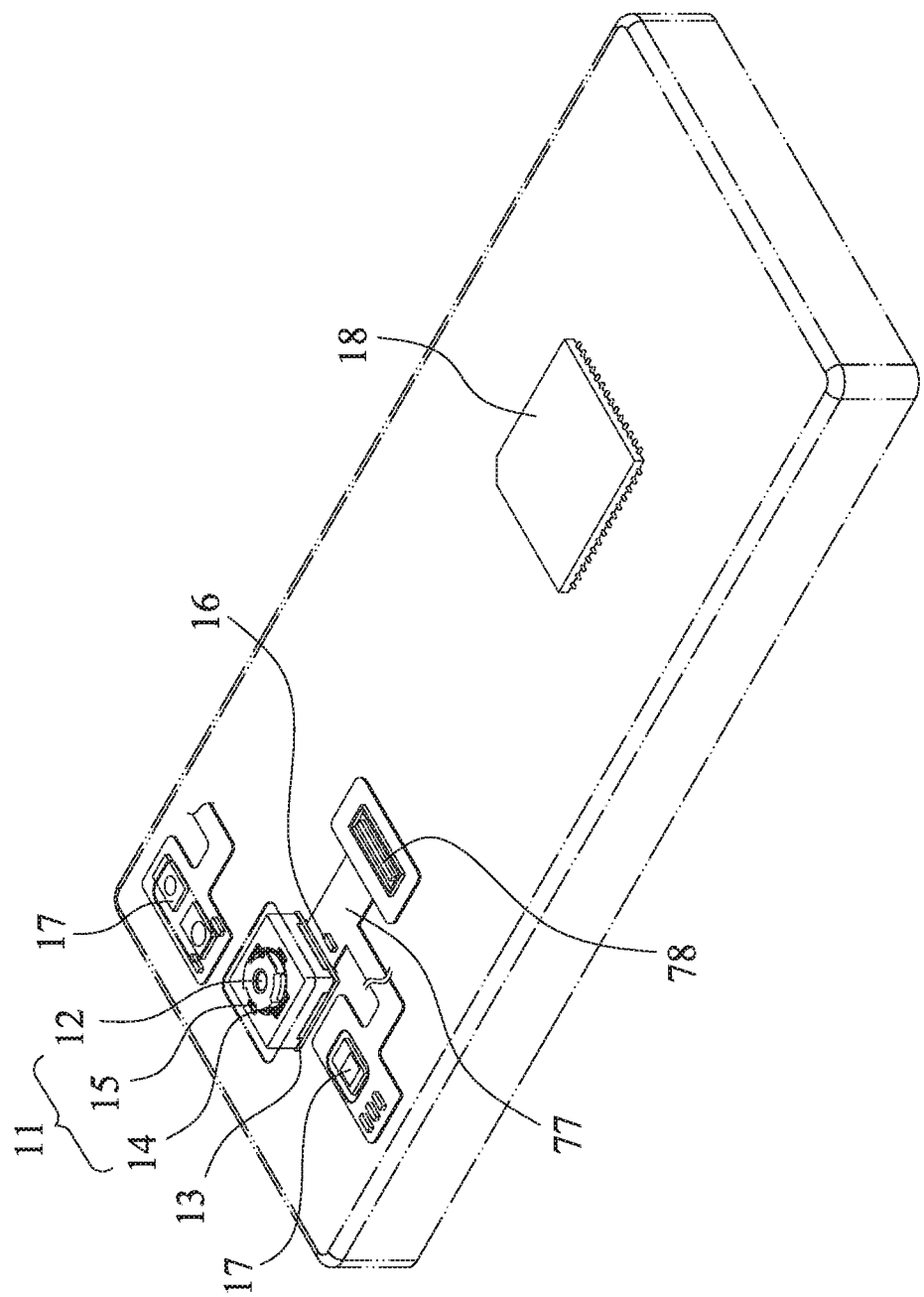
FIG. 5B shows another schematic view of the electronic device according to the 5th embodiment.

FIG. 5A shows a schematic view of an electronic device 10 according to the 5th embodiment of the present disclosure, FIG. 5B shows another schematic view of the electronic device 10 according to the 5th embodiment, and particularly, FIG. 5A and FIG. 5B are schematic views related to a camera of the electronic device 10. In FIG. 5A and FIG. 5B, the electronic device 10 of the 5th embodiment is a smart phone. The electronic device 10 includes a camera unit 11, wherein the camera unit 11 includes an imaging lens module 12 according to the present disclosure and an image sensor 13. The imaging lens module 12 may be one of the aforementioned imaging lens modules 100, 200, 300 and 400, or another imaging lens module according to the present disclosure. The image sensor 13 is disposed on an image surface (not shown in drawings) of the imaging lens module 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 5th embodiment can be a touch screen 19a, a button 19b and etc. At this moment, the imaging light of the imaging lens module 12 is converged on the image sensor 13, and the electronic signal associated with image is output to an image signal processor (ISP) 18.

Figure 5C:
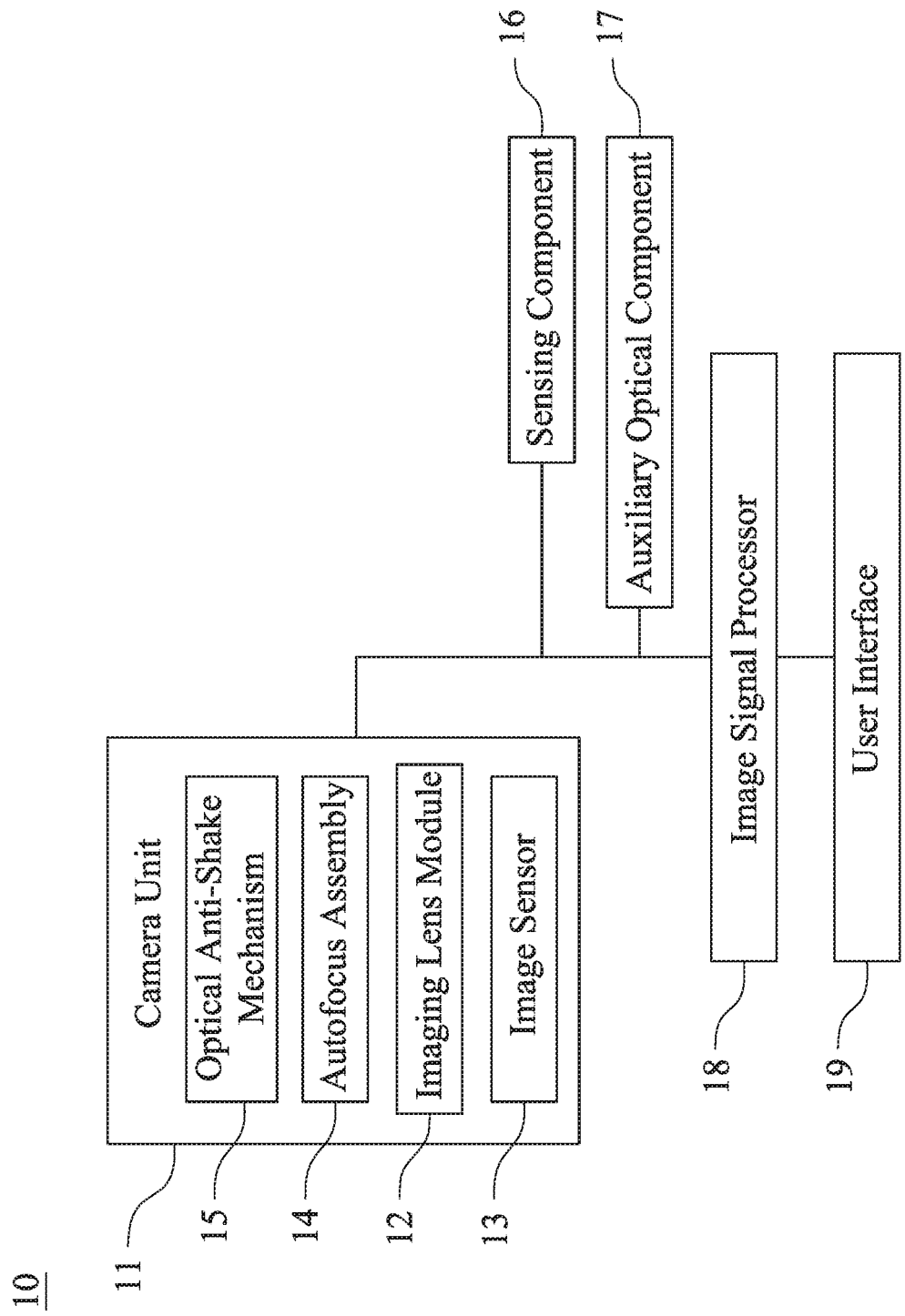
FIG. 5C shows a block diagram of the electronic device according to the 5th embodiment.

FIG. 5C shows a block diagram of the electronic device 10 according to the 5th embodiment, and in particular, the block diagram is related to the camera of the electronic device 10. In FIG. 5A to FIG. 5C, the camera unit 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera unit 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 5B, the camera unit 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera unit and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera unit can also be controlled more flexibly via the touch screen of the electronic device. In the 5th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

6th Embodiment

Figure 6A:
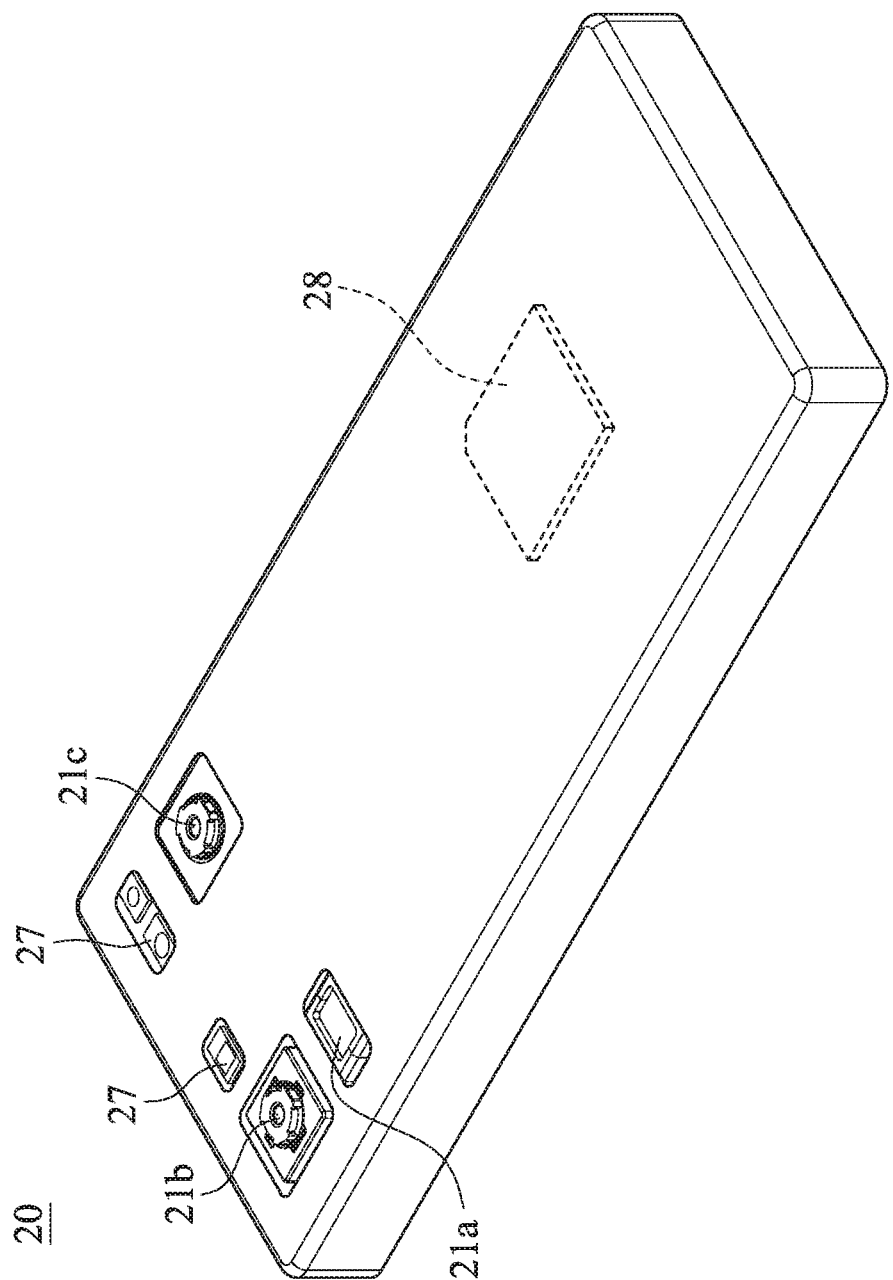
FIG. 6A shows a schematic view of an electronic device according to the 6th embodiment of the present disclosure.
Figure 6B:
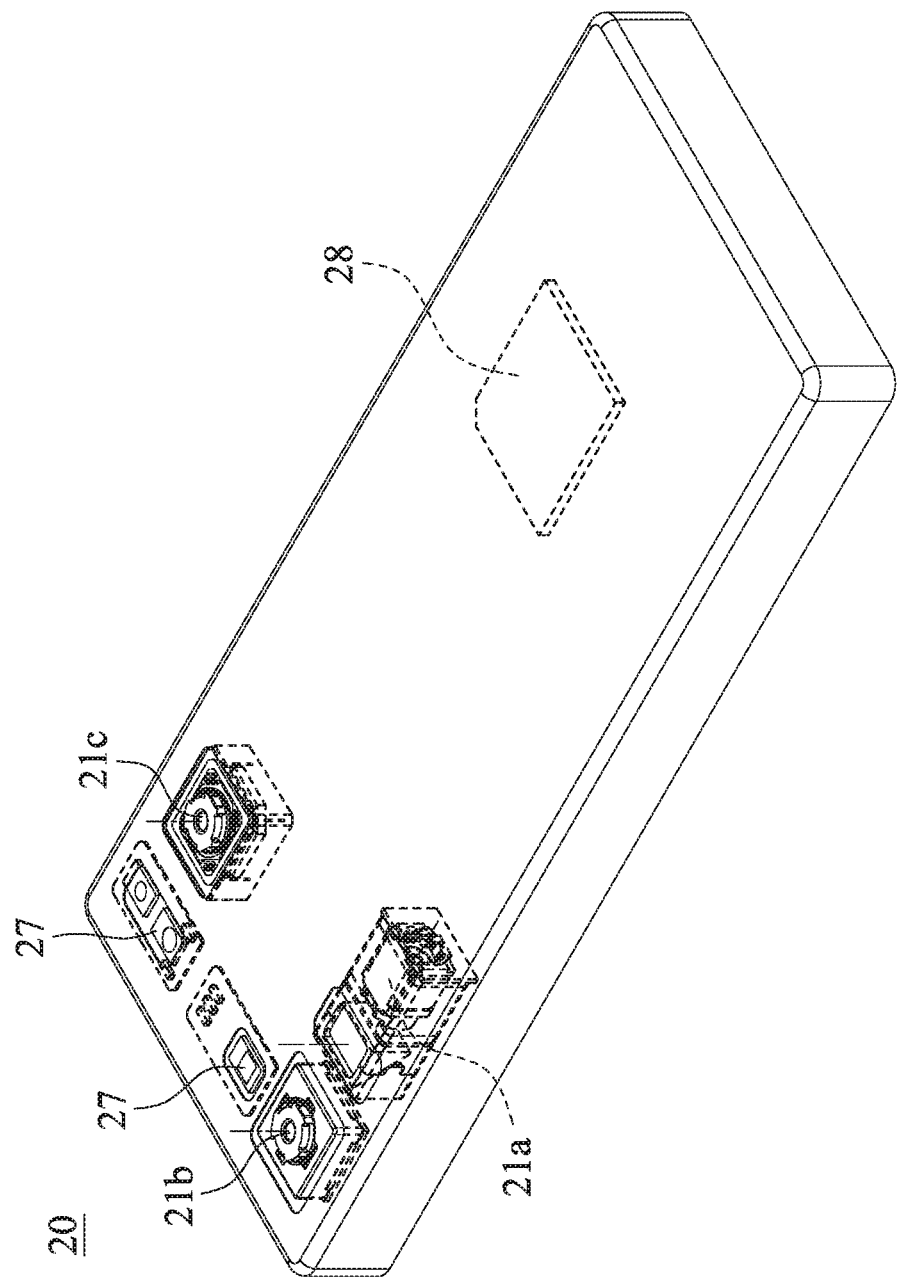
FIG. 6B shows another schematic view of the electronic device according to the 6th embodiment.

FIG. 6A shows a schematic view of an electronic device 20 according to the 6th embodiment of the present disclosure, and FIG. 6B shows another schematic view of the electronic device 20 according to the 6th embodiment. In FIG. 6A and FIG. 6B, the electronic device 20 of the 6th embodiment is a smart phone. The electronic device 20 includes camera units 21a, 21b and 21c, which are disposed on the same side of the electronic device 20 and may have different optical properties. At least one of the camera units 21a, 21b and 21c includes an imaging lens module according to the present disclosure and an image sensor, and the image sensor is disposed on an image surface of the imaging lens module. In another embodiment according to the present disclosure (not shown in the drawings), the electronic device may be an electronic device with at least two camera units, e.g., a smart phone with two camera units, a smart phone with three camera units, a smart phone with four camera units, or a tablet personal computer with two camera units.

In the photographing procedure of the electronic device 20, at least one image can be captured by the camera units 21a, 21b and 21c with an aid of an auxiliary optical component 27, and then the required effects like zooming, delicate images would be achieved by the processors (such as an image signal processor 28 and so on) equipped in the electronic device 20. In addition, it should be realized that the configurations of the camera units of the electronic device according to the present disclosure are not limited to the positions disclosed in FIG. 6A and FIG. 6B.

7th Embodiment

Figure 7:
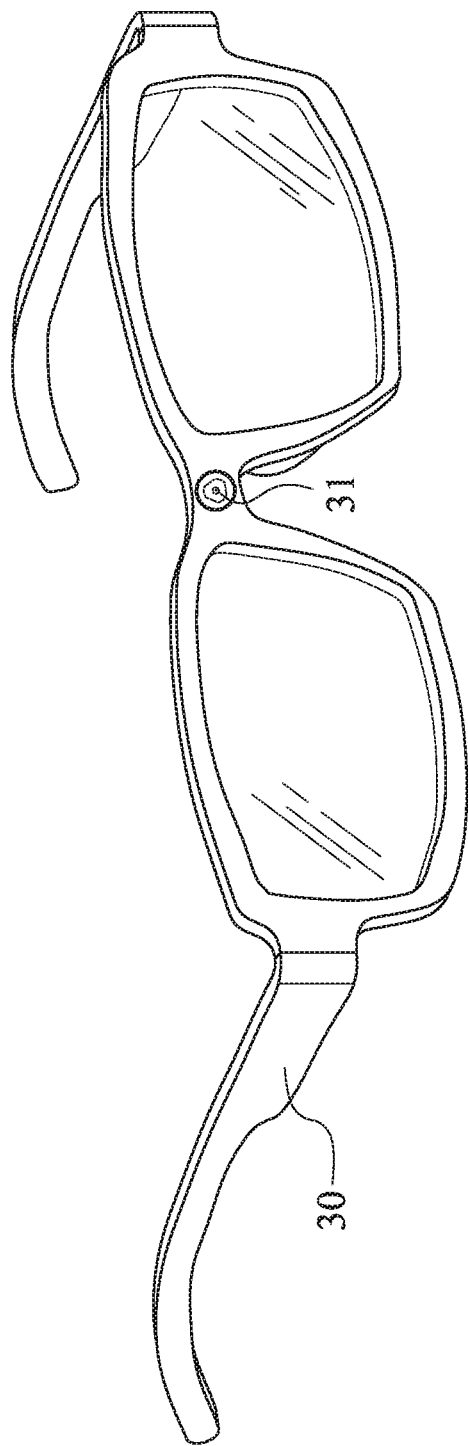
FIG. 7 shows an electronic device according to the 7th embodiment of the present disclosure.

FIG. 7 shows an electronic device 30 according to the 7th embodiment of the present disclosure. The electronic device 30 of the 7th embodiment is a wearable device. The electronic device 30 includes a camera unit 31. The camera unit 31 includes an imaging lens module (not shown in drawings) according to the present disclosure and an image sensor (not shown in drawings), and the image sensor is disposed on an image surface of the imaging lens module.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, having an optical axis, an object side and an image side, and comprising:
   a plastic barrel surrounding the optical axis to form an accommodating space, wherein the plastic barrel comprises a first contacting surface, which is close to an image-side end of the plastic barrel;
   an optical lens assembly disposed in the accommodating space of the plastic barrel and comprising a plurality of optical lens elements;
   an image-side assembled element disposed close to the image-side end of the plastic barrel and comprising an opening structure, wherein the image-side assembled element is in a tube shape and extends in a direction from the object side to the image side, the image-side assembled element surrounds the optical axis and is disposed coaxially with the plastic barrel, the image-side assembled element further comprises a second contacting surface and an inner protruding portion, the second contacting surface is disposed close to an object-side end of the image-side assembled element and correspondingly to the first contacting surface, the inner protruding portion extends toward the optical axis, and a minimum opening of the image-side assembled element is located at the inner protruding portion; and
   a light blocking element assembly disposed in the image-side assembled element and comprising a plurality of light blocking elements, wherein one of the light blocking elements is abutted with an annular wall of the inner protruding portion;

wherein no optical lens element is disposed in the image-side assembled element;

wherein the plastic barrel and the image-side assembled element contact each other via the first contacting surface and the second contacting surface, a length along an optical axis direction of the plastic barrel is L1, a length along the optical axis direction of the image-side assembled element is L2, and the following condition is satisfied:

$$1.5 < L1/L2 < 5.0.$$

2. The imaging lens module of claim 1, wherein a glue groove is formed between the plastic barrel and the image-side assembled element, and a glue material is disposed in the glue groove.

3. The imaging lens module of claim 2, wherein at least one of the first contacting surface and the second contacting surface comprises a plurality of stripe structures, each of the stripe structures is in a stripe shape and extends to the glue groove, and the stripe structures are regularly arranged along a circumferential direction of the optical axis.

4. The imaging lens module of claim 2, further comprising:
a first retainer disposed in the accommodating space of the plastic barrel and for fixedly disposing the optical lens assembly, wherein another glue groove is formed between the plastic barrel and the first retainer, and another glue material is disposed in the another glue groove.

5. The imaging lens module of claim 4, wherein a contact surface of the plastic barrel and a contact surface of the first retainer contact each other, at least one contact surface of the contact surface of the plastic barrel and the contact surface of the first retainer comprises a plurality of stripe structures, each of the stripe structures is in a stripe shape and extends to the another glue groove, and the stripe structures are regularly arranged along a circumferential direction of the optical axis.

6. The imaging lens module of claim 2, further comprising:
a second retainer disposed in the image-side assembled element and for fixedly disposing the light blocking element assembly, wherein another glue groove is formed between the image-side assembled element and the second retainer, and another glue material is disposed in the another glue groove.

7. The imaging lens module of claim 6, wherein a contact surface of the image-side assembled element and a contact surface of the second retainer contact each other, at least one contact surface of the contact surface of the image-side assembled element and the contact surface of the second retainer comprises a plurality of stripe structures, each of the stripe structures is in a stripe shape and extends to the another glue groove, and the stripe structures are regularly arranged along a circumferential direction of the optical axis.

8. The imaging lens module of claim 1, wherein the minimum opening is formed by a minimum inner annular surface of the image-side assembled element, the minimum inner annular surface comprises a plurality of arc sections and a plurality of line sections, the arc sections have the same radius value and the same circle center, the arc sections and the line sections are alternatively arranged along a circumferential direction of the optical axis, and each of the line sections is connected two of the arc sections.

9. The imaging lens module of claim 1, further comprising:
a light blocking sheet disposed between the plastic barrel and another annular wall of the inner protruding portion, wherein an object-side surface of the light blocking sheet is abutted with the plastic barrel, and an image-side surface of the light blocking sheet is abutted with the another annular wall.

10. The imaging lens module of claim 9, wherein one of the light blocking elements of the light blocking element assembly is another light blocking sheet, an inner opening is formed by an inner annular surface of one of the light blocking sheet and the another light blocking sheet, the inner annular surface comprises a plurality of arc sections and a plurality of line sections, the arc sections have the same radius value and the same circle center, the arc sections and the line sections are alternatively arranged along a circumferential direction of the optical axis, and each of the line sections is connected two of the arc sections.

11. The imaging lens module of claim 9, wherein the plastic barrel further comprises a directional protrusion, which protrudes toward the optical axis and extends along the optical axis direction;
wherein the light blocking sheet comprises a directional notch recessed toward the optical axis;
wherein the image-side assembled element comprises a directional groove, which is recessed toward the optical axis and extends along the optical axis direction;
wherein the directional protrusion is disposed correspondingly to the directional notch and the directional groove.

12. The imaging lens module of claim 9, wherein one of the light blocking elements of the light blocking element assembly is another light blocking sheet, an inner opening is formed by an inner annular surface of one of the light blocking sheet and the another light blocking sheet, the inner annular surface has a chamfering structure, and the inner annular surface is tapered from the image side to the object side or from the object side to the image side.

13. The imaging lens module of claim 1, wherein the image-side assembled element is made of a black plastic material by an injection molding method, and the image-side assembled element further comprises at least two gate traces.

14. The imaging lens module of claim 13, wherein the image-side assembled element further comprises a plurality of wedge structures, which are regularly arranged along a circumferential direction of the optical axis, and each of the wedge structures is tapered toward the optical axis.

15. The imaging lens module of claim 14, wherein a number of the gate traces is at least three.

16. The imaging lens module of claim 1, wherein among the optical lens elements of the optical lens assembly, a distance along the optical axis direction between an object-side surface of one of the optical lens elements closest to the object side and an image-side surface of one of the optical lens elements closest to the image side is Td;
wherein among the light blocking elements of the light blocking element assembly, a distance along the optical axis direction between an object-side surface of one of the light blocking elements closest to the object side and an image-side surface of one of the light blocking elements closest to the image side is W;
wherein the following condition is satisfied:

$$10 < W/Td < 0.35.$$

17. The imaging lens module of claim 1, wherein a diameter of a minimum opening of the plastic barrel is φ1, a diameter of the minimum opening of the image-side assembled element is φ2, and the following condition is satisfied:

$$0.7 < \varphi2/\varphi1 < 1.2.$$

18. The imaging lens module of claim 3, wherein a number of the stripe structures of the at least one of the first contacting surface and the second contacting surface is N, and the following condition is satisfied:

$$60 \leq N \leq 360.$$

19. The imaging lens module of claim 1, wherein a length along the optical axis direction of each of the first contacting surface and the second contacting surface is d, a smallest distance from the first contacting surface and the second contacting surface to the optical axis is D, and the following condition is satisfied:

$$0.03 < d/D < 0.35.$$

20. The imaging lens module of claim 1, further comprising:
   an optical folding element disposed close to an object-side end of the plastic barrel.

21. An electronic device, comprising:
   the imaging lens module of claim 1; and
   an image sensor disposed on an image surface of the imaging lens module.

* * * * *

UNITED STATES PATENT AND TRADEMARK OFFICE
CERTIFICATE OF CORRECTION

PATENT NO. : 11,604,325 B2
APPLICATION NO. : 16/812507
DATED : March 14, 2023
INVENTOR(S) : Chien-Hsun Wu et al.

It is certified that error appears in the above-identified patent and that said Letters Patent is hereby corrected as shown below:

In the Claims

In Column 24, Line 67, Claim 16, delete "10" and insert therefor --0.10--.

Signed and Sealed this
Twenty-third Day of May, 2023

Katherine Kelly Vidal
*Director of the United States Patent and Trademark Office*